United States Patent
Suh et al.

(10) Patent No.: US 8,898,328 B2
(45) Date of Patent: *Nov. 25, 2014

(54) METHOD OF PROCESSING NON-REAL TIME SERVICE AND BROADCAST RECEIVER

(75) Inventors: Jong Yeul Suh, Seoul (KR); Gomer Thomas, Arlington, WA (US); Jae Hyung Song, Seoul (KR); Jin Pil Kim, Seoul (KR); Ho Taek Hong, Seoul (KR); Joon Hui Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 280 days.

This patent is subject to a terminal disclaimer.

(21) Appl. No.: 13/422,669

(22) Filed: Mar. 16, 2012

(65) Prior Publication Data

US 2012/0180087 A1 Jul. 12, 2012

Related U.S. Application Data

(63) Continuation of application No. 12/591,415, filed on Nov. 18, 2009, now Pat. No. 8,166,192.

(60) Provisional application No. 61/115,888, filed on Nov. 18, 2008, provisional application No. 61/121,178, filed on Dec. 9, 2008, provisional application No. 61/121,181, filed on Dec. 9, 2008, provisional application No. 61/138,494, filed on Dec. 17, 2008, provisional application No. 61/153,985, filed on Feb. 20, 2009, provisional application No. 61/153,973, filed on Feb. 20, 2009, provisional application No. 61/161,416, filed on Mar. 19, 2009, provisional application No. 61/179,005, filed on May 17, 2009.

(51) Int. Cl.
*G06F 15/16* (2006.01)
*H04N 21/235* (2011.01)
*H04N 21/478* (2011.01)
*H04N 21/435* (2011.01)
*H04N 21/434* (2011.01)

(52) U.S. Cl.
CPC .......... *H04N 21/435* (2013.01); *H04N 21/235* (2013.01); *H04N 21/478* (2013.01); *H04N 21/4345* (2013.01)
USPC .............. 709/231; 709/217; 725/86; 725/101

(58) Field of Classification Search
None
See application file for complete search history.

(56) References Cited

U.S. PATENT DOCUMENTS

| | | | |
|---|---|---|---|
| 7,917,644 B2 * | 3/2011 | Vedantham et al. | .......... 709/231 |
| 7,996,868 B2 | 8/2011 | Sicher et al. | |
| 2006/0193337 A1 | 8/2006 | Paila et al. | |

(Continued)

FOREIGN PATENT DOCUMENTS

| | | |
|---|---|---|
| KR | 10-2000-0033019 | 6/2000 |
| KR | 10-2002-0080048 | 10/2002 |

(Continued)

*Primary Examiner* — Mohamed Ibrahim
(74) *Attorney, Agent, or Firm* — McKenna Long & Aldridge LLP

(57) ABSTRACT

A method of receiving and processing a broadcast signal including a Non-Real Time (NRT) service and a broadcast receiver are disclosed herein. A method of processing a Non-Real Time (NRT) service in a broadcast receiver, the method comprises receiving and processing a signaling information table including access information of the NRT service, receiving data of the NRT service based on the signaling information table in non-real time and storing the received data of the NRT service in a storage medium, extracting service information including service type of the NRT service and detail information of the NRT service from the signaling information table, and controlling processes of the NRT service based on the extracted service information.

8 Claims, 27 Drawing Sheets

(56) References Cited

U.S. PATENT DOCUMENTS

| | | |
|---|---|---|
| 2007/0078944 A1* | 4/2007 | Charlebois et al. ........... 709/217 |
| 2007/0283408 A1 | 12/2007 | Lee |
| 2009/0228928 A1* | 9/2009 | Lee et al. ........................ 725/55 |
| 2009/0300598 A1 | 12/2009 | Choi |
| 2010/0095328 A1 | 4/2010 | Hartung et al. |
| 2010/0169504 A1 | 7/2010 | Gabin et al. |
| 2010/0309387 A1 | 12/2010 | Eyer |
| 2011/0001885 A1 | 1/2011 | Eyer |
| 2011/0004907 A1 | 1/2011 | Eyer |
| 2011/0004908 A1 | 1/2011 | Eyer |
| 2011/0004910 A1 | 1/2011 | Eyer |

FOREIGN PATENT DOCUMENTS

| | | |
|---|---|---|
| KR | 10-2007-0078213 | 7/2007 |
| WO | WO 2007/086704 | 8/2007 |

* cited by examiner

FIG. 4

| Syntax | No. of Bits | Format |
|---|---|---|
| virtual_channel_table_section(){ | | |
|     table_id | 8 | 0xC8 |
|     section_syntax_indicator | 1 | '1' |
|     Private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0;i<num_channels_in_section;i++){ | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for(i=0;i<N;i++){ | | |
|             descriptor() | | |
|         } | | |
|     } | | |
|     reserved | 6 | '111111' |
|     additional_descriptors_length | 10 | uimsbf |
|     for(j=0;j<N;j++){ | | |
|         additional_descriptor() | | |
|     } | | |
|     CRC_32 | 32 | rpchof |
| } | | |

FIG. 5

| service_type | Meaning |
|---|---|
| 0x00 | [Reserved] |
| 0x01 | Analog_television - The virtual channel carries analog television programming |
| 0x02 | ATSC_digital_television - The virtual channel carries television programming (audio, video and optional associated data) conforming to ATSC standards |
| 0x03 | ATSC_audio - The virtual channel carries audio programming (audio service and optional associated data) conforming to ATSC standards |
| 0x04 | ATSC_data_only_service - The virtual channel carries a data service conforming to ATSC standards, but no video of stream_type 0x02 or audio of stream_type 0x81 |
| 0x05-0x3F | [Reserved for future ATSC use] |

FIG. 6

| Value | Meaning |
|---|---|
| 0x00 | [Reserved] |
| 0x01 | analog_television - The virtual channel carries analog television programming |
| 0x02 | ATSC_digital_television - The virtual channel carries television programming (audio, video and optional data) conforming to ATSC standards |
| 0x03 | ATSC_audio - The virtual channel carries audio programming (audio service and optional data) conforming to ATSC standards |
| 0x04 | ATSC_data_only_service - The virtual channel carries a data service conforming to ATSC standards, but no video of stream_type 0x02 or audio of stream_type 0x81 |
| 0x05 | Software Download Data Service – see A/97 |
| 0x06 | Unassociated/small screen service – see A/65C Amendment 1 |
| 0x07 | Parameterized Service – New A/V CODEC |
| 0x08 | ATSC_nrt_service — The virtual channel carries a NRT service conforming to ATSC standards |
| 0x09-0x7F | [ Reserved for future ] |
| 0x80-0xFF | [ User Private ] |

FIG. 7

| Syntax | No. of Bits | Format |
|---|---|---|
| data_service_table_bytes() { | | |
|   sdf_protocol_version | 8 | uimsbf |
|   application_count_in_section | 8 | uimsbf |
|   if(application_count_in_section > 0) { | | |
|     for(j = 0; j <application_count_in_section; j++) { | | |
|       compatibility_descriptor() | | |
|       app_id_byte_length | 16 | uimsbf |
|       if(app_id_byte_length > 1) { | | |
|         app_id_description | 16 | uimsbf |
|         for(i=0;i<app_id_byte_length-2;i++) { | | |
|           app_id_byte | 8 | bslbf |
|         } | | |
|       } | | |
|       tap_count | 8 | uimsbf |
|       for(i=0;i<tap_count; i++) { | | |
|         protocol_encapsulation | 8 | uimsbf |
|         action_type | 7 | uimsbf |
|         resource_location | 1 | bslbf |
|         Tap() | | |
|         tap_info_length | 16 | uimsbf |
|         for(k=0; k<N; k++) { | | |
|           descriptor() | | |
|         } | | |
|       } | | |
|       app_info_length | 16 | uimsbf |
|       for(i=0; i<M; i++) { | | |
|         descriptor() | | |
|       } | | |
|       app_data_length | 16 | uimsbf |
|       for(i=0; i<app_data_length; i++) { | | |
|         app_data_byte | 8 | bslbf |
|       } | | |
|     } | | |
|   } | | |
|   service_info_length | 16 | uimsbf |
|   for(j=0; j<K; j++) | | |
|     descriptor() | | |
|   } | | |
|   service_private_data_length | 16 | uimsbf |
|   for(j=0; j<service_private_data_length; j++){ | | |
|     service_private_data_byte | 8 | bslbf |
|   } | | |
| } | | |

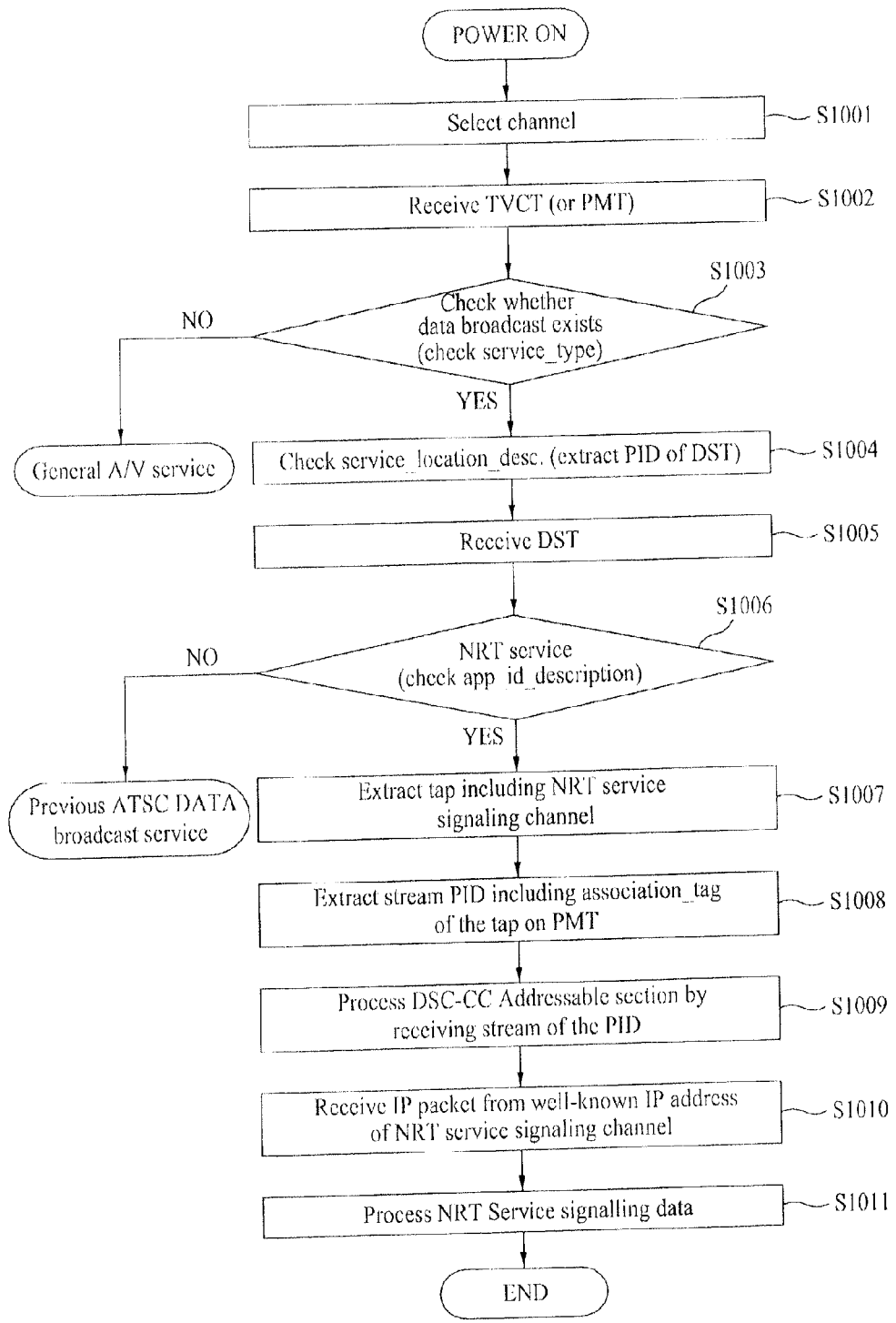

FIG. 10

| Syntax | No.of Bits | Format |
|---|---|---|
| NRT_service_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     NST_protocol_version | 8 | uimsbf |
|     reserved | 8 | '11111111' |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_NRT_services | 8 | uimsbf |
|   for (j=0;j< num_NRT_services; j++) | | |
|   { | | |
|     NRT_service_id | 16 | uimsbf |
|     reserved | 2 | '11' |
|     NRT_service_status | 2 | uimsbf |
|     SP_indicator | 1 | bslbf |
|     short_NRT_service_name_length /* m */ | 3 | uimsbf |
|     short_NRT_service_name | 16*m | |
|     reserved | 2 | '11' |
|     NRT_service_category | 6 | uimsbf |
|     num_components | 5 | uimsbf |
|     IP_version_flag | 1 | bslbf |
|     source_IP_address_flag | 1 | bslbf |
|     NRT_service_destination_IP_address_flag | 1 | bslbf |
|     if (source_IP_address_flag) | | |
|       source_IP_address | 32 or 128 | uimsbf |
|     if (NRT_service_destination_IP_address_flag) | | |
|       NRT_service_destination_IP_address | 32 or 128 | uimsbf |
|     for (j=0;j< num_components; j++) | | |
|     { | | |
|       reserved | 1 | '1' |
|       essential_component_indicator | 1 | bslbf |
|       component_destination_IP_address_flag | 1 | bslbf |
|       port_num_count | 5 | uimsbf |
|       component_destination_UDP_port_num | 16 | uimsbf |
|       if (component_destination_IP_address_flag) | | |
|         component_destination_IP_address | 32 or 128 | uimsbf |
|       reserved | 4 | '1111' |

FIG. 11

| | | |
|---|---|---|
| num_component_level_descriptors<br>for (k=0;k< num_components_level_descriptors; k++)<br>{<br>    component_level_descriptor()<br>}<br>}<br>reserved<br>num_NRT_service_level_descriptors<br>for (m=0; m<num_NRT_service_level_descriptors; m++)<br>{<br>    NRT_service_level_descriptor()<br>}<br>}<br>reserved<br>num_virtual_channel_level_descriptors<br>for (n=0; n<num_virtual_channel_level_descriptors; n++) {<br>{<br>    virtual_channel_level_descriptor()<br>}<br>} | 4<br><br>var<br><br><br>4<br>4<br><br><br>var<br><br><br>4<br>4<br><br>var | uimsbf<br><br><br><br><br>'1111'<br>uimsbf<br><br><br><br><br>'1111'<br>uimsbf |

FIG. 12

| Syntax | No.of Bits | Format |
|---|---|---|
| NRT_component_descriptor() { | | |
|     descriptor_tag | 8 | 0 x CB |
|     descriptor_length | 8 | uimsbf |
|     component_type | 7 | uimsbf |
|     component_encryption_flag | 1 | |
|     if (component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     NRT_component_data(component_type) | var | |
| } | | |

FIG. 13

| Syntax | No. of Bits | Format |
|---|---|---|
| NRT_component_data() { | | |
|    TSI | 16 | uimsbf |
|    session_start_time | 32 | uimsbf |
|    session_end_time | 32 | uimsbf |
|    reserved | 5 | '11111' |
|    tias_bandwidth_indicator | 1 | bslbf |
|    as_bandwidth_indicator | 1 | bslbf |
|    FEC_OTI_indicator | 1 | bslbf |
|    if (tias_bandwidth_indicator == '1') { | | |
|       tias_bandwidth | 16 | uimsbf |
|    } | | |
|    if (as_bandwidth_indicator == '1') { | | |
|       as_bandwidth | 16 | uimsbf |
|    } | | |
|    if (FEC_OTI_indicator == '1') { | | |
|       FEC_encoding_id | 8 | uimsbf |
|       FEC_instance_id | 16 | uimsbf |
|    } | | |
| } | | |

FIG. 14

| Syntax | No. of Bits | Format |
|---|---|---|
| NRT_service_info_descriptor ( ) { | | |
|     descriptor_tag | 8 | 0xTBD |
|     descriptor_length | 8 | uimsbf |
|     application_type | 8 | uimsbf |
|     user_control_flag | 1 | bslbf |
|     storage_requirement | 31 | uimsbf |
|     num_video_elements | 4 | uimsbf |
|     num_audio_elements | 4 | uimsbf |
|     for (i=0; i < num_video_elements; i++) { | | |
|         video_codec_type | 8 | uimsbf |
|     } | | |
|     for (i=0; i < num_audio_elements; i++) { | | |
|         audio_codec_type | 8 | uimsbf |
|     } | | |
|     encapsulation_type | 8 | uimsbf |
|     web_content_type | 8 | uimsbf |
|     expiration_type | 8 | uimsbf |
|     expiration_value | 16 | uimsbf |
|     controlled_rendering_flag | 1 | bslbf |
|     if(controlled_rendering_flag=='1') { | | |
|         target_window_position_horizontal | 16 | uimsbf |
|         target_window_position_vertical | 16 | uimsbf |
|         target_window_length_horizontal | 16 | uimsbf |
|         target_window_length_vertical | 16 | uimsbf |
|     } | | |
| } | | |

FIG. 15

| Value | type |
|---|---|
| 0 | General Video/Audio Clip (Pull type) |
| 1 | Frequently Updated Content (News, Information, Weather Service) |
| 2 | Music Distribution |
| 3 | Targeted Advertisement |
| 4 | Applications Data |
| 5 | Private/Subscription-based Content (Push type) |
| 6 | Text Data |
| 7 | File Management Data |
| 8 | Web Content |
| 9 | Still Images |
| 10 | Maintenance Data |
| 11~255 | Reserved |

FIG. 16
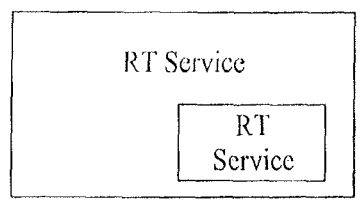
(a)
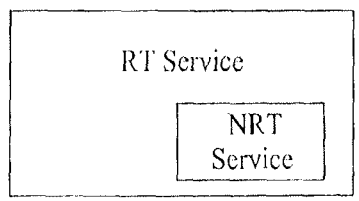
(b)
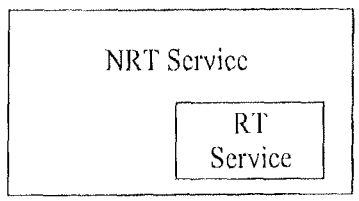
(c)
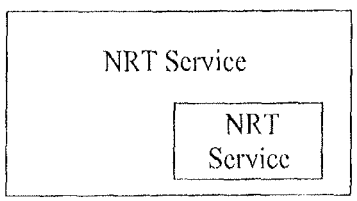
(d)

FIG. 18

| Syntax | No. of Bits | Format |
|---|---|---|
| NRT_information_table_section() { | | |
|     table_id | 8 | 0xTBD |
|     section_syntax_indicator | 1 | '1' |
|     private_indicator | 1 | '1' |
|     reserved | 2 | '11' |
|     section_length | 12 | uimsbf |
|     service_id | 16 | uimsbf |
|     reserved | 2 | '11' |
|     NRT_IT_version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     time_span_start | 32 | uimsbf |
|     reserved | 5 | '11111' |
|     time_span_length | 11 | uimsbf |
|     num_items_in_section | 8 | uimsbf |
|     for (j=0; j< num_items_in_section; j++) { | | |
|         content_linkage | 32 | uimsbf |
|         updates_available | 1 | bslbf |
|         reserved | 1 | '1' |
|         TF_available | 1 | bslbf |
|         low_latency | 1 | bslbf |
|         playback_length_in_seconds | 20 | uimsbf |
|         content_length_included | 1 | bslbf |
|         playback_delay_included | 1 | bslbf |
|         expiration_included | 1 | bslbf |
|         reserved | 1 | '1' |
|         duration | 12 | uimsbf |

FIG. 19

| | | |
|---|---|---|
| if (content_length_included==1) { | | |
|     content_length | 40 | uimsbf |
| } | | |
| if (playback_delay_included==1) { | | |
|     reserved | 4 | '1111' |
|     playback_delay | 20 | uimsbf |
| } | | |
| if (expiration_included==1) { | | |
|     expiration | 32 | uimsbf |
| } | | |
| content_name_length | 8 | uimsbf |
| content_name_text() | var | |
| reserved | 4 | '1111' |
| content_descriptors_length | 12 | uimsbf |
| for (i=0; i<N; i++) { | | |
|     content_descriptor() | | |
| } | | |
| } | | |
| reserved | 6 | '111111' |
| descriptors_length | 10 | uimsbf |
| for (i=0; i<M; i++) { | | |
|     descriptor() | | |
| } | | |
| } | | |

FIG. 26

| Syntax | No. of Bits | Format |
|---|---|---|
| service_map_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     SMT_protocol_version | 8 | uimsbf |
|     ensemble_id | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_services | 8 | uimsbf |
|   for (j=0; j< num_services; j++) { | | |
|     service_id | 16 | uimsbf |
|     multi_ensemble_service | 2 | uimsbf |
|     service_status | 2 | uimsbf |
|     SP_indicator | 1 | bslbf |
|     short_service_name_length | 3 | uimsbf |
|     short_service_name | 16*m | |
|     reserved | 2 | '11' |
|     service_category | 6 | uimsbf |
|     num_components | 5 | uimsbf |
|     IP_version_flag | 1 | bslbf |
|     source_IP_address_flag | 1 | bslbf |
|     service_destination_IP_address_flag | 1 | bslbf |
|     if (source_IP_address_flag) { | | |
|       source_IP_address | 32 or 128 | uimsbf |
|     } | | |
|     if (service_destination_IP_address_flag) { | | |
|       service_destination_IP_address | 32 or 128 | uimsbf |
|     } | | |
|     for (j=0; j< num_components; j++) { | | |
|       reserved | 1 | '1' |
|       essential_component_indicator | 1 | bslbf |
|       component_destination_IP_address_flag | 1 | bslbf |
|       port_num_count | 5 | uimsbf |
|       component_destination_UDP_port_num | 16 | uimsbf |
|       if (component_destination_IP_address_flag) { | | |
|         component_destination_IP_address | 32 or 128 | uimsbf |
|       } | | |
|       reserved | 4 | '1111' |
|       num_component_level_descriptors | 4 | uimsbf |
|       for (k=0; k< num_components_level_descriptors; k++) { | | |
|         component_level_descriptor() | var | |
|       } | | |
|     } | | |
|     reserved | 4 | '1111' |
|     num_service_level_descriptors | 4 | uimsbf |
|     for (m=0; m<num_service_level_descriptors; m++) { | | |
|       service_level_descriptor() | var | |
|     } | | |
|   } | | |
|   reserved | 4 | '1111' |
|   num_ensemble_level_descriptors | 4 | uimsbf |
|   for (n=0; n<num_ensemble_level_descriptors; n++) { | | |
|     ensemble_level_descriptor() | var | |
|   } | | |
| } | | |

METHOD OF PROCESSING NON-REAL TIME SERVICE AND BROADCAST RECEIVER

This application is a Continuation of application Ser. No. 12/591,415, filed on Nov. 18, 2009 now U.S. Pat. No. 8,166,192 and claims the benefit of U.S. Provisional Application No. 61/115,888 filed on Nov. 18, 2008, 61/121,178 and 61/121,181 filed on Dec. 9, 2008, 61/138,494 filed on Dec. 17, 2008, 61/153,985 and 61/153,973 filed on Feb. 20, 2009, 61/161,416 filed on Mar. 19, 2009 and 61/179,005 filed on May 17, 2009.

BACKGROUND OF THE INVENTION

1. The Field

The present disclosure relates to a method for processing non-real time service and broadcast receiver thereof.

2. Description of the Related Art

A digital television (DTV) can provide video and audio services which are conventional TV services, but can also provide various other services. For example, the DTV can provide an Electronic Program Guide (EPG) or the like to the user and can simultaneously provide broadcast services received through 2 or more channels. Especially, the number of services that a reception system can provide has been significantly increased since the reception system has been equipped with a large-capacity storage device and has been connected to the Internet or data communication channels which enable bidirectional communication.

SUMMARY OF THE INVENTION

An object of the present invention is to provide a method of receiving a non-real time service and a broadcast receiver thereof.

Another object of the present invention is to provide a method of signaling service information which includes type and detailed information relating to a non-real time service and the broadcast receiver thereof.

Another object of the present invention is to provide a method of processing a non-real time service according to service information and the broadcast receiver thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the above objectives according to an embodiment of the present invention to process a non-real time service of a broadcast receiver, the steps may include receiving and processing a signaling information table including access information of the NRT service, receiving data of the NRT service based on the signaling information table in non-real time and storing the received data of the NRT service in a storage medium, extracting service information including service type of the NRT service and detail information of the NRT service from the signaling information table, and controlling processes of the NRT service based on the extracted service information.

The service information may further include a user control field indicating whether the user is authorized to manage a file included in the NRT service, a field indicating codec information of the NRT service, and a field indicating an expiration period of the NRT service stored in the storage.

The service information includes a field indicating when the NRT service is a web service according to the service type, whether the web service is supported by a web browser in the broadcast receiver.

The service information includes a field providing a display location and size within the display of the NRT service.

If the NRT service is a Fixed NRT service, a file and the signaling information table included in the NRT service is received in packetized Internet Protocol (IP), packetized addressable section, and packetized Moving Picture Experts Group-2 (MPEG-2) Transport Packet (TP).

If the NRT service is a Mobile NRT service, a file and the signaling information table included in the NRT service is received in packetized IP included in an Ensemble.

A broadcast receiver for receiving a broadcast signal including a Non-Real Time (NRT) service includes a first processing unit, a second processing unit, and a service manager. The first processing unit receives and processes a signaling information table including access information of the NRT service. The second processing unit receives data of the NRT service based on the signaling information table in non-real time and stores the received data of the NRT service in a storage medium. The service manager extracts service information including service type of the NRT service and detail information of the NRT service from the signaling information table and controls processes of the NRT service based on the extracted service information.

The broadcast receiver further includes a presentation manager to output the detail information of the service type of the NRT service and detail information of the NRT service in a guide display.

Other objects, features, and advantages of the present invention will be apparent through a detailed description of the embodiments with reference to the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 illustrates an embodiment of a bit stream syntax structure of a virtual channel table according to the present invention;

FIG. 5 illustrates an embodiment of service type field values in the virtual channel table of FIG. 4 and respective meanings of the values;

FIG. 6 illustrates another embodiment of values allocated to a service type field in the virtual channel table of FIG. 4 and respective meanings of the values;

FIG. 7 illustrates an embodiment of a bit stream syntax structure of a data service table (DST) of the present invention;

FIG. 9 is a flowchart illustrating a procedure for obtaining access information of an IP stream that carries an NRT service signaling channel using a PSI/PSIP table according to an embodiment of the present invention;

FIG. 10 and FIG. 11 illustrate a bit stream syntax structure of a Non-Real Time Service Table (NST) according to the present invention;

FIG. 12 illustrates a bit stream syntax structure of a component_descriptor( ) according to an embodiment of the present invention;

FIG. 13 illustrates a bit stream syntax of FLUTE file delivery data using the component_descriptor( ) of FIG. 12;

FIG. 14 illustrates a bit stream syntax structure of NRT_service_info_descriptor( ) according to an embodiment of the present invention;

FIG. 15 illustrates the meaning of the allocated values to the application_type field in FIG. 14;

FIGS. 16(*a*) through 16(*d*) illustrate examples real time service and non-real time service shown in the same display screen according to the present invention;

FIG. 18 and FIG. 19 illustrate a bit stream syntax structure of a Non-Real Time Information Table (NRT-IT) according to an embodiment of the present invention;

FIG. 26 illustrates a bit stream syntax structure of a Service Map Table (SMT) according to the present invention.

DESCRIPTION OF THE PREFERRED EMBODIMENTS

Figure 1:
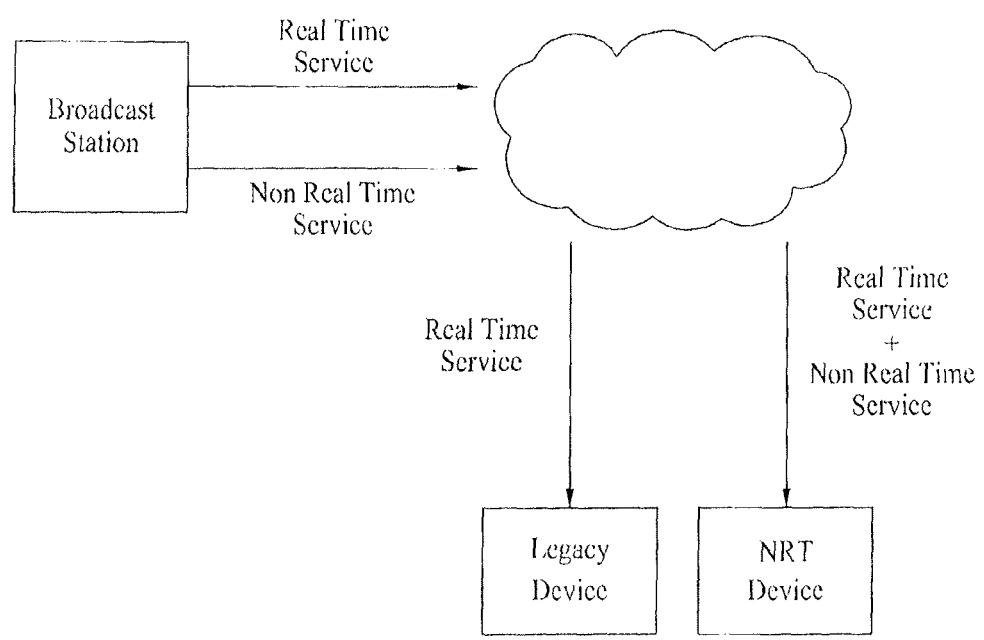
FIG. 1 illustrates a conceptual diagram of providing a real-time (RT) service and a non-real time (NRT) service.

Preferred embodiments of the invention, which can achieve the above objects, will now be described with reference to the accompanying drawings. The configuration and operation of the invention, illustrated in the drawings and described below with reference to the drawings, will be described using at least one embodiment without limiting the spirit and the essential configuration and operation of the invention.

Although most terms of elements in the present invention have been selected from general ones widely used in the art taking into consideration their functions in the invention, the terms may be changed depending on the intention or convention of those skilled in the art or the introduction of new technology. Some terms have been arbitrarily selected by the applicant and their meanings are explained in detail in the following description as needed. Thus, the definitions of the terms used in the invention should be determined based on the whole content of this specification together with the intended meanings of the terms rather than their simple names or meanings.

The term real time (RT) service used in the present invention actually means the real-time service. In other words, it is restricted in time. On the other hand, non-real time (NRT) service refers to non-real time, not RT service. Thus, NRT service is not restricted in time. Further the data used in NRT service is referred to as NRT service data.

A broadcast receiver according to the present invention receives NRT service through terrestrial, cable, internet, and the like.

The NRT service is stored in the broadcast receiver and then it is displayed through a display according to a time specified by the user or at the user's request. The NRT service is received and stored in a file format according to an embodiment. In an embodiment, the storage is an internal HDD attached to the inside of the broadcast receiver. In another embodiment, the storage may be Universal Serial Bus (USB) memory or an external HDD connected externally with the broadcast receiving system.

In order to receive and store the files configuring the NRT service and provide service to the user, signaling information or NRT service signaling data according to the present invention.

FIG. 1 illustrates a conceptual diagram of how a RT and an NRT service are provided.

The broadcast station, following the conventional method, transmits the current terrestrial broadcast (or mobile broadcast) RT service. At this juncture, the broadcast station may provide NRT service using the extra bandwidth or a specific bandwidth left after sending the RT service. Thus, RT service and NRT service are transmitted through a same or a different channel. Therefore, a broadcast receiver can be divided into RT service and NRT service, and in order to provide the user with the NRT service when needed, NRT service signaling information (or NRT service signaling data) is required. The NRT service signaling information (or NRT service signaling data) will be described below in detail.

For example, a broadcast station can transmit broadcast service data in real time and transmit news clips, weather information, advertisements, push VOD, or the like in non-real time. The NRT service many not only provide such news clips, weather information, advertisements, and push VOD, but may also provide specific clips and detailed information on specific program from a real-time broadcast service.

A conventional broadcast receiver (i.e., a legacy device) can receive and process RT services but cannot receive and process NRT services. Thus, it is a principle that the process of the conventional broadcast receiver (i.e., a legacy device) is not affected by NRT stream included in the transmission of RT service. In other words, the conventional broadcast receiver does not have a method of handling the NRT service even if it is received.

However, the broadcast receiver (i.e., an NRT device) according to an embodiment of the present invention can combine NRT services and RT services to provide a variety of services to the user compared to the convention receiver.

Figure 2:
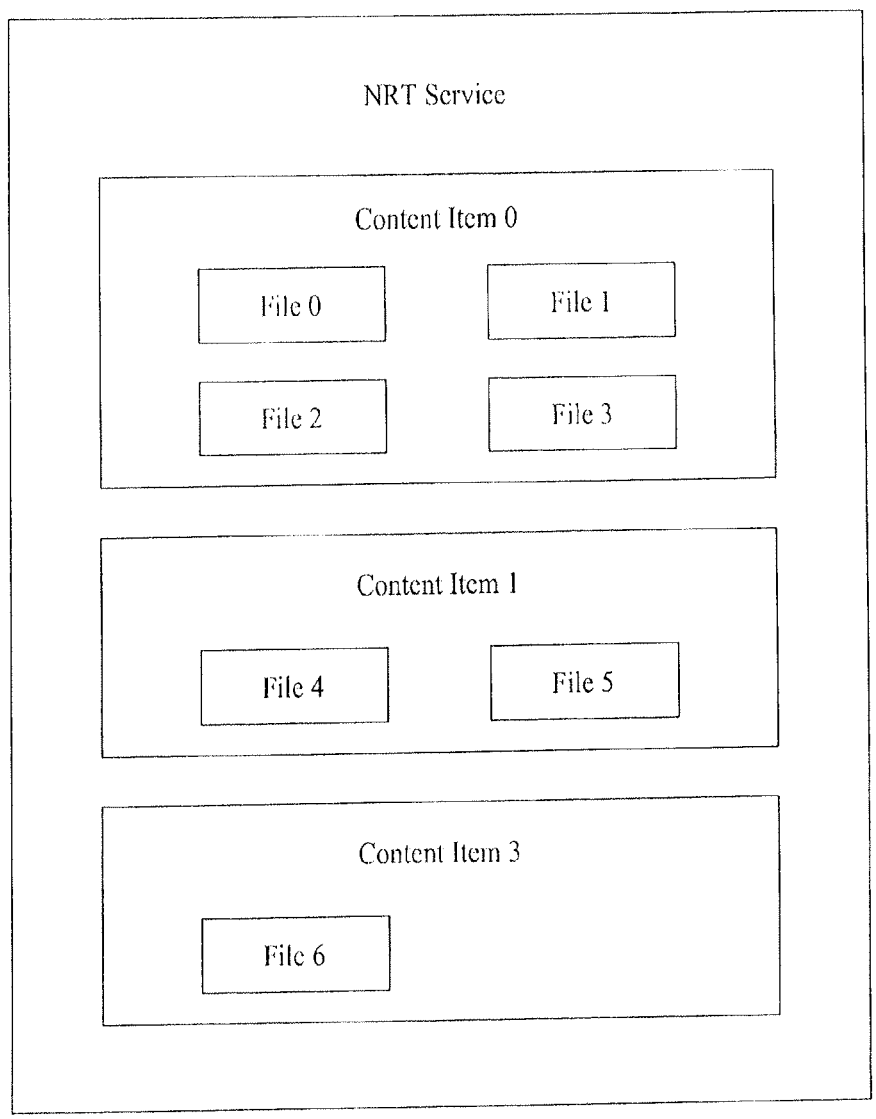
FIG. 2 is a diagram illustrating the relationship between an NRT service, content items, and files.

In an embodiment, one NRT service according to the present invention includes one or more content item (or content or NRT content) and one content item includes one or more files as shown in FIG. 2. The terms "file" and "object" have the same meaning in the description of the present invention.

The content item is the minimum unit that can be presented independently. For example, when a news program, which includes an economic news section, a political news section, and a life news section, is provided in non-real time, the news program may be an NRT service and each of the economic news section, the political news section, and the life news section may be the content item. And each of the economic news section, the political news section, and the life news section may include at least one file.

In the present invention, depending on acquiring the IP datagram, the service may be divided into Fixed NRT service and Mobile NRT service. The Fixed NRT service, especially, is provided through fixed broadcast receiver, and the Mobile NRT service is provided through mobile broadcast receiver. In the present invention, Fixed NRT service will be explained first and then Mobile NRT service will be explained.

Fixed NRT Service

In an embodiment of the present invention, for fixed NRT service, the file-type NRT service is packetized according to an IP scheme in the IP layer and then transmitted through a specific virtual channel in an MPEG-2 TS format.

Thus, Fixed NRT service may be transmitted through the same broadcast channel as the RT service or through an exclusive broadcast channel in a MPEG-2 TS packetized format. In order to identify the NRT service, a unique PID is allocated in the TS packet of the NRT service data when transmitted. In an embodiment of the present invention, the IP based NRT service data is transmitted in MPEG-2 TS packetized format.

The NRT service signaling data required to receive the NRT service data is transmitted through an NRT service signaling channel. The NRT service signaling channel is transmitted through a specific IP stream in the IP layer. Here, the IP stream is also packetized into an MPEG-2 TS packet for transmission. The NRT service signaling data transmitted through an NRT service signaling channel includes NRT Service Map Table (NST) and NRT Information Table (NRT-IT). In an embodiment of the present invention, the NST provides the access information of at least one NRT service and at least one content item/file that forms NRT services that operate in the IP layer. In one embodiment of the present invention, NRT-IT provides detailed information of the content item/file that forms NST service. In the present invention, the NST and the NRT-IT may be referred to as Signaling Information Table for Fixed NRT service.

Figure 3:
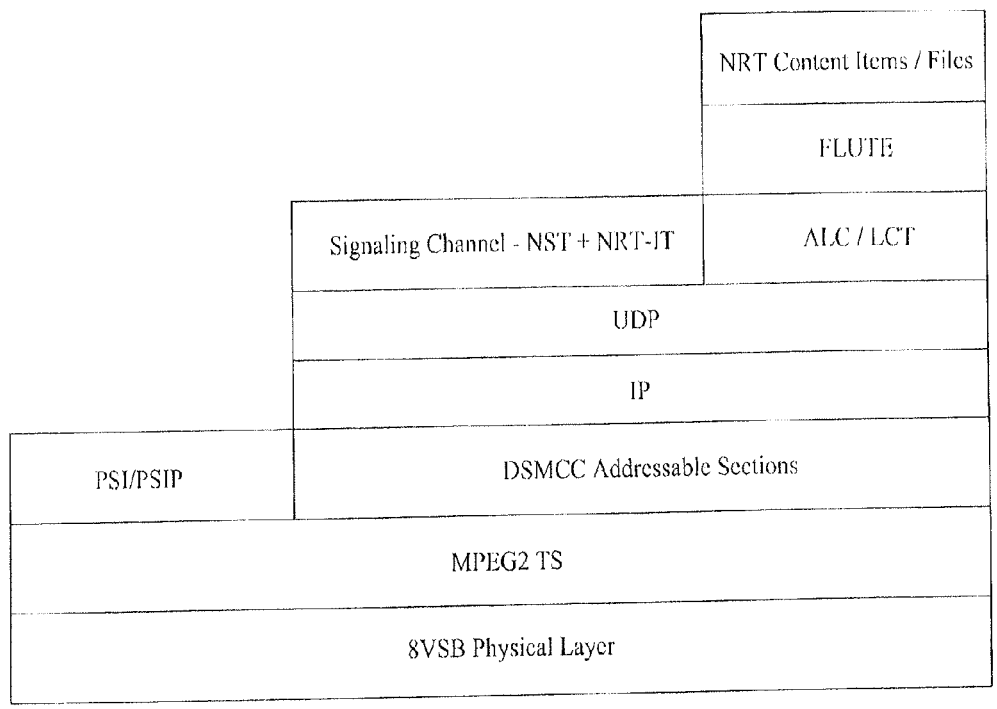
FIG. 3 illustrates an embodiment of a protocol stack for a fixed NRT service according to the present invention.

FIG. 3 illustrates a diagram for a protocol stack of a fixed NRT service configured according to an embodiment of the present invention.

In an embodiment of the present invention, for fixed NRT service, the file-type NRT service is packetized according to an IP scheme in the IP layer and then transmitted through a specific virtual channel in an MPEG-2 TS format.

In an embodiment of the present invention, as an example of the MPEG-2 based Program Specific Information/Program and System Information Protocol (PSI/PSIP) table, the presence of the NRT service may be signaled through the virtual channel in the Virtual Channel Table (VCT).

In an embodiment of the present invention, the NRT service signaling channel that transmits NRT service signaling data which signals the access information of the IP based NRT service is transmitted in an MPEG-2 TS format after being packetized according to an IP stream in the IP layer through a specific virtual channel.

More specifically, in the broadcast station, NRT content/files are packetized according to a file transfer protocol scheme and are again packetized according to an Asynchronous Layered Coding/Layered Coding Transport (ALC/LCT) scheme as shown in FIG. 3. The packetized ALC/LCT data is again packetized according to a UDP scheme and the packetized ALC/LCT/UDP data is again packetized into ALC/LCT/UDP/IP data according to an IP scheme. Herein, the ALC/LCT/UDP/IP data includes File Description Table (FDT) containing information about FLUTE session. In the present invention, the packetized ALC/LCT/UDP/IP data is referred to as an "IP datagram" for ease of explanation.

In addition, NRT service signaling data required to receive the NRT content/files is transmitted through an NRT service signaling channel. Here, the NRT service signaling channel is packetized according to a User Datagram Protocol (UDP) scheme and the packetized UDP data is again packetized into UDP/IP data according to an IP scheme. In the present invention, the UDP/IP data is also referred to as an "IP datagram" for ease of explanation. In an embodiment, multicast of the NRT service signaling channel is achieved after being encapsulated in an IP datagram having a well-known IP destination address and a well-known destination UDP port number.

In an embodiment of the present invention, IP datagrams of the NRT service signaling channel and the NRT service are encapsulated in an addressable section structure and again packetized in an MPEG-2 TS format. So, one addressable section structure has a format in which a section header and a CRC checksum are added to one IP datagram. This addressable section structure format complies with a Digital Storage Media Command and Control (DSM-CC) section format for private data transmission. Thus, the addressable section is also referred to as a "DSM-CC addressable section." A 188-byte MPEG-2 TS packet can be created by dividing the addressable section data into 184-byte units and adding a 4-byte MPEG header to each 184-byte unit. At this time, a value allocated to a PID of the MPEG header is a unique value that can identify TS packets that carry the NRT service signaling channel and the NRT service.

Program Specific Information (PSI) and Program and System Information Protocol (PSIP) table section data is also packetized into MPEG-2 TS packets.

An embodiment of the PSI table may include a Program Map Table (PMT), a Program Association Table (PAT), or the like and an embodiment of the PSIP table may include a Virtual Channel Table (VCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), and a Master Guide Table (MGT).

The MPEG-2 TS packets are modulated according to a predetermined transmission scheme, for example, a VSB transmission scheme, in a physical layer and are then transmitted to the reception system.

In an embodiment of the present invention, the transmission of an NRT service is determined by signaling through a PSI/PSIP table. For example, whether or not an NRT service is transmitted is signaled in a Virtual Channel Table (VCT).

FIG. 4 illustrates a syntax structure of the Virtual Channel Table (VCT) section according to an embodiment.

The VCT section, taking information about the virtual channel for example, transmits information of channel information for channel selection and PID information for receiving audio and/or video. Thus, when the VCT section is parsed, the PID of the audio and video of the broadcast program transmitted within the channel along with the channel number and channel name is known.

The VCT section syntax includes at least one of table_id field, section_syntax_indicator field, private_indicator field, section_length field, transport_stream_id field, version_number field, current_next_indicator field, section_number field, last_section_number field, protocol_version field, num_channels_in_section field.

The VCT section syntax further includes first 'for' loop (virtual channel loop) which repeats for the number indicated in the num_channels_in_section field value, the first loop includes at least one of short_name field, major_channel_number field, minor_channel_number field, modulation_mode field, carrier_frequency field, channel_TSID field, program_number field, ETM_location field, access_controlled field, hidden field, service_type field, source_id field, descriptor_length field, or second 'for' loop which repeats for the number of the descriptors included in the first loop. For the convenience of explanation in the present invention, the second loop is referred to as the first descriptor loop. The descriptor( ) included in the first descriptor loop is a descriptor applied in each virtual channel.

The VCT section syntax may further include a third 'for' loop which repeats for the number of value indicated by additional_descriptor_length field and the number of descriptor added in the VCT section. For the convenience of explanation in the present invention, the third loop is referred to as the second descriptor loop. The additional_descriptors( ) included in the second descriptor loop is applied to all the descriptors described in the virtual channel of the VCT section.

A table_id field illustrated in FIG. 4 indicates a unique identifier or identification (ID) which identifies that the information transmitted through the table is VCT. More specifically, the table_id field indicates a value informing that the table corresponding to this section is a VCT. For example, a 0xC8 value may be given to the table_id field.

A version_number field indicates the version number of the VCT, the section_number field indicates the number of this section, and the last_section_number field indicates the number of the last section of a complete VCT. The num_channels_in_section field designates the number of the overall virtual channel existing within the VCT section.

A short_name field in the first 'for' loop indicates the name of a virtual channel. The major_channel_number field indicates a 'major' channel number associated with the virtual channel defined within the first loop and the minor_channel_number field indicates 'minor' channel number. Thus, each channel number should be connected to the major and minor channel numbers, and the major and minor channel numbers are used as user reference numbers for the corresponding virtual channel.

A short_name field in the first 'for' loop indicates the name of a virtual channel. The major_channel_number field indicates a 'major' channel number associated with the virtual channel defined within the first loop and the minor_channel_number field indicates 'minor' channel number. Thus, each channel number should be connected to the major and minor channel numbers, and the major and minor channel numbers are used as user reference numbers for the corresponding virtual channel.

A service_type field indicates the service type within the corresponding virtual channel.

In an embodiment, the virtual channel may include at least one RT service and at least one NRT service including audio and/or video.

In this case, service type values may be allocated as shown in FIG. 5 and a value of 0x04 representing an ATSC-data-only service may be used to indicate that an NRT service is provided through the virtual channel.

In another embodiment, the virtual channel may only include one or more NRT service. In such a case, as shown in FIG. 6, a new service_type field value of 0x08 may be defined to indicate that an NRT service is provided through the virtual channel.

A source_id field indicates a program source connected to the corresponding virtual channel.

The term "source" refers to a specific source such as a video, text, data or audio source. The source_id field has a unique value in a transport stream in which a VCT is transmitted.

On the other hand, data service table (DST) may be received through PID included in the service_location_descriptor of the VCT, and through the DST, the types of the application and the detailed information of the data broadcast stream transmitted through the channel is known.

In the present invention, NRT application (NRT service) is identified through the DST.

FIG. 7 illustrates the DST section syntax structure according to an embodiment.

An sdf_protocol_version field (8-bit) indicates the version of the Service Description Framework protocol.

An application_count_in_section field (8-bit) indicates the number of applications listed within the DST section.

A compatibility_descriptor( ) field indicates that the corresponding structure includes DSM-CC compatible descriptor. The object is to signal the compatibility requests of the application of the platform received to determine the ability to use the corresponding data service.

An app_id_byte_length field (16-bit) indicates the number of bytes used to identify the application.

An app_id_description field (16-bit) indicates the format and the semantics of the next application identification bytes. As described in the table 1 below, '0x0003' is newly assigned to identify that the corresponding application is an NRT application. The assigned value of '0x0003' is just an exemplary value and the scope of this application is not limited to the value.

TABLE 1

| Value | Application Identifier Format |
|---|---|
| 0x0000 | DASE application |
| 0x0001 | ATSC reserved |
| 0x0002 | ATSC A/92 Application |
| 0x0003 | NRT Application |
| 0x0004-0x7FFF | ATSC reserved |
| 0x8000-0xFFFF | User private |

An app_id_byte field (8-bit) describes the byte of the application identifier.

A tap_count field (8-bit) indicates the number of Tap( ) structure used by the corresponding application.

A protocol_encapsulation field (8-bit) indicates the type of the protocol encapsulation used to transmit the specific data element in reference with the Tap( ) field.

An action_type field (7-bit) instructs the character of the data in reference with the Tap( ) field.

A resource_location field (1-bit) indicates the location of the association_tag field that matches the association_tag value listed within the next Tap structure. If the value of the corresponding field is '0,' then the matching association_tag exist in the PMT of the current MPEG-2 program. Oppositely, if the value is '1,' then the matching association_tag exists in the DSM-CC Resource Descriptor in the Network Resources Table of the corresponding data service.

A Tap( ) field, for example, is defined in a unique structure including the following. The tap_id field (16-bit) is used by the application to identify the data elements. The range of the value of tap_id is determined by the app_id_byte fields related to Tap( ) within the DST. The value of tap_id is selected by the data service provider. Further, it is used in application to handle the data elements.

A Use field (16-bit) is used to specify the communication channel referenced by the association_tag.

An association_tag field (16-bit) uniquely identifies one from the listed DSM-CC resource descriptor within the Network Resource Table or listed data elementary stream within the PMT.

A Selector( ) field indicates a unique data element that can be used in the communication channel referenced by association_tag field or in the data elementary stream.

A tap_info_length field (16-bit) indicates the number of bytes of the descriptors of the next field of the corresponding field.

A descriptor( ) field follows the descriptor format.

An app_info_length field (8-bit) indicates number of bytes of the descriptor of the next corresponding field.

A descriptor( ) field follows the descriptor format.

An app_data_length field (16-bit) indicates length of the app_data_byte fields in bytes.

An app_data_byte (8-bit) describes the private data fields different from input parameters associated with the application as 1 byte.

A service_info_length field (8-bit) indicates number of byte unit of the next descriptors.

A descriptor( ) field follows the descriptor format.

A service_private_data_length field (16-bit) indicates length of byte unit of the private fields.

A service_private_data_byte field (8-bit) describes the private fields as 1 byte.

Figure 8:
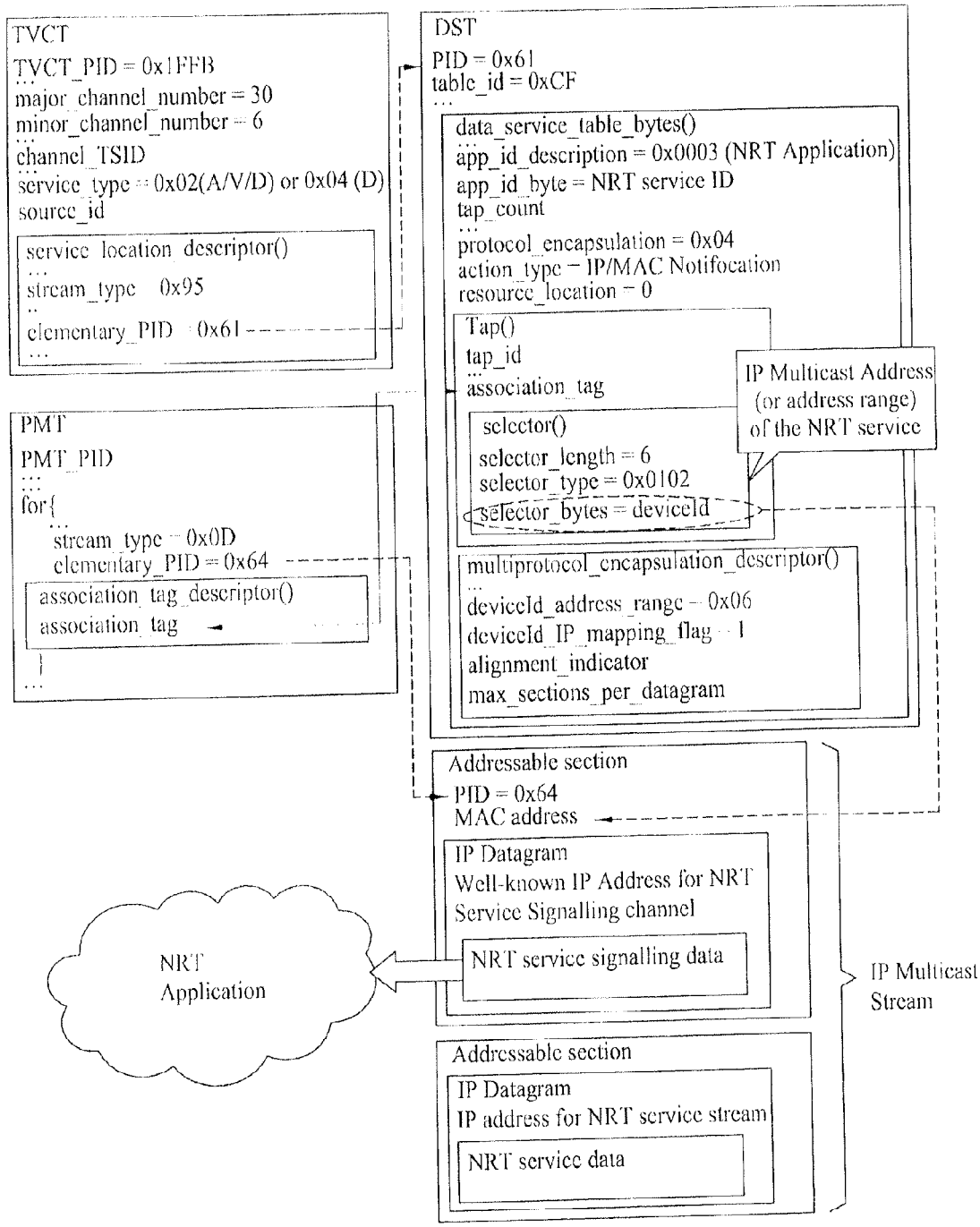
FIG. 8 illustrates an embodiment of a procedure for obtaining access information of an IP stream that carries an NRT service signaling channel using a PSI/PSIP table according to the present invention.

FIG. 8 illustrates a method in which an NRT service is received and provided using an ATSC A/90 standard for carrying (or transmitting) a data broadcast stream and an ATSC A/92 standard for transmitting an IP multicast stream in a broadcast receiver according to the present invention.

Namely, information of a stream that constitutes each virtual channel is signaled in an ES_loop of a PMT or a service location descriptor of a VCT. For example, an NRT service stream can be transmitted through the virtual channel in the case where the service type of the VCT is 0x02 (i.e., digital A/V Data), 0x04 (i.e., data only), or 0x08 (i.e., NRT only service), as shown in FIG. 5 or FIG. 6. At this time, when the stream_type field included in the service location descriptor (or the ES loop of the PMT) has a value allocated 0x95 (i.e., DST transmission), this indicates that a data broadcast is transmitted. A normal A/V is transmitted if the service location descriptor has no value for stream_type field or does not have a value of 0x95 allocated. Therefore, if the stream_type field included in the service location descriptor has a value of 0x95, the Elementary_PID field value is a PID of a Data Service Table (DST). Thus, the DST can be received through the Elementary_PID field.

The type of the application and details of a data broadcast stream transmitted through this channel can be determined through the DST. In the present invention, an NRT application (i.e., an NRT service) is identified using the DST.

That is, an App_id_description field of the DST specifies the format and analysis of application identification bytes subsequent to this field. In an embodiment of the present invention, '0x0003' is allocated to the App_id_description field in order to identify the NRT application. The illustrated value (number) is only an example and does not limit the scope of the present invention.

If the App_id_description field value is '0x0003', an Application_id_byte value subsequent to this field is a service ID of the NRT application. A service ID of the NRT application may have a URI value that globally and uniquely identifies the corresponding service.

After the NRT application is identified as described above, a PID of an MPEG-2 TS packet separated from the IP datagram of the NRT service signaling channel is located through the Tap information. Then, an IP datagram that carries the NRT service signaling channel can be obtained from MPEG-2 TS packets having the PID found through the tap information and NRT service signaling data can be obtained from the obtained IP datagram. Here, well-known IP access information, i.e., a well-known IP address and a well-known UDP port number can be used as the IP access information of the NRT service signaling channel.

That is, an asynchronous IP stream is transmitted if a Protocol_encapsulation field value in the DST is 0x04 and a device_id value indicating the destination address is transmitted through a selector_bytes value if a Selector_type field value is 0x0102. A multiprotocol_encapsulation_descriptor is used in order to accurately analyze the selector_bytes value and signals the number of valid bytes included in the device_id value. As a result, an IP multicast address (or address range) of the NRT service signaling channel transmitted through the PID can be determined through the Tap information.

Accordingly, the IP multicast address (or address range) is accessed and an IP stream, i.e., an IP packet, is received and NRT service signaling data is extracted from the received IP packet.

NRT service data, i.e., NRT content/files, is received based on the extracted NRT service signaling data and the received data can be stored in a storage medium or can be displayed on a display.

In another embodiment of the present invention, the NRT service can be signaled using a new value, for example, 0x96 instead of 0x95 as the stream_type field value of the DST. This embodiment aims to eliminate the risk that the conventional receiver may malfunction with the NRT service which is a new application, in the case where the conventional receiver operates by determining whether or not a data broadcast stream is present based only on whether or not a stream having a stream type value of 0x95 is present. In this case, if a new stream type is defined, it will be possible to allow the conventional receiver to ignore this stream type, thereby guaranteeing backward compatibility.

FIG. 9 is a flowchart illustrating the process of NRT service signaling data and the process of extracting the NRT service data.

In an embodiment, as shown in FIG. 9, the service_type field in the VCT has a value of 0x08 as in FIG. 6, indicating that at least one NRT service is transmitted through the relevant virtual channel.

After a power of a receiver has been turned on, if a default channel or a channel by a user is selected [S1001], the receiver receives a VCT or a PMT [S1002]. And then the receiver determines whether NRT service exists or not by parsing the VCT [S1003]. This can be done through looking at the service_type in the received virtual channel loop within the VCT. The [S1001] step is processed in the tuner and the [S1002]/[S1003] step is processed in the PSI/PSIP section handler.

For instance, if a value of the service_type is not set to '0x08', the relevant virtual channel will not transmit NRT service. The virtual channel will then transmit conventional service (i.e., legacy ATSC service), the receiver processes according to the information included in the virtual channel.

If the service_type field has a value of 0x08, the virtual channel will transmit NRT service. In such a case, service location descriptor in the virtual channel of the VCT is parsed to extract the PID of DST [S1004]. Then, using the extracted PID, DST is received [S1005]. The [S1004] and [S1005] step is processed through the demultiplexer controlled by the service manager.

It is then determined whether the corresponding service provided on the selected channel is an NRT service from the received DST [S1006].

The determination of a presence of the NRT service can be performed by checking the value of the App_id_description field.

For instance, the value of the App_id_description is set to '0x0003,' in this present invention to identify that the service is an NRT application (i.e., NRT service). The value (number) is only an example and will not limit the scope of the present invention.

If the value of the App_id_description field is '0x0003,' the value of the subsequent Application_id_byte becomes the value of service ID of the NRT application (i.e., NRT service). As a result of identifying the NRT application, a Tap is extracted to locate the PID of the MPEG-2 TS packet separated from the IP datagram of the NRT service signaling channel [S1007]. And, stream PID including association_tag of the Tap is extracted from the PMT [S1008]. The steps of [S1006] to [S1008] are processed by the service manager or the PSI/PSIP section handler.

After receiving and decapsulating the MPEG-2 TS packets corresponding to the stream PID, i.e., removing the MPEG-2 header, a DSM-CC addressable section is recovered [S1009]. This process is handled by the addressable section handler.

Subsequently, after removing section header and CRC checksum from the DSM-CC addressable section, IP datagram transmitting the NRT service signaling channel is recovered [S1010], and the NRT service signaling data is obtained from the recovered IP datagram [S1011]. At this time, the access information of the IP datagram transmitting the NRT service signaling channel is received from a well-known destination IP address and well-known destination UDP port number.

If a value of Protocol_encapsulation in the DST is set to '0x04', an asynchronous IP datagram is transferred. If Selector_type is set to '0x0102', a value of device_id indicating a destination address is delivered via selector_bytes. In order to accurately analyze the value of the selector_bytes, multiprotocol_encapsulation_descriptor is used and the number of the valid byte within the device_id is signaled. As a result, the IP Multicast address (or address range) of the NRT service signaling channel transmitted through PID of the Tap information is known.

Thus, by accessing the IP Multicast address (or address range), IP stream, i.e., IP packet is received, and the NRT service signaling data is extracted from the IP packet.

Based on the extracted NRT service signaling data, NRT service data, i.e., NRT content item/files can be received and stored in a storage unit or can be displayed through a display.

In an embodiment, the NRT service signaling data transmitted through the NRT service signaling channel may include NRT Service Map Table (or Service Table: NST) and NRT Information Table (NRT-IT).

In an embodiment, IP datagrams of the NST and NRT-IT has the same well-known IP address and well-known UDP port number. Therefore, the determination of NST and NRT-IT included in the NRT service signaling data is done through table identifier. Thus, the table identifier can be the table_id of the corresponding table or the header of the table section, and when necessary, table_id_extension can be referred to in order to identify the table.

The NST provides access information of the NRT service. In one embodiment NST has a similar table format as the MPEG-2 Private section type.

The NST provides access information of IP based NRT services included in the virtual channel. For example, the NST provides access information of each FLUTE sessions that configures one NRT service.

Here, whether one NST is configured with one session or plurality of sessions is determined through the table_id field, section_number field, last_section_number field, and the like. And the table may be completed by removing the IP header and the UDP header of the IP datagrams of the NRT service signaling channel and gathering sections having the same table identifier. For example, by gathering the sections having table identifier allocated for NST, the NST is completed.

FIG. 10 and FIG. 11 illustrate a bit stream syntax structure of an NST section according to an embodiment of the present invention. The detail of each field of the NST section is explained in the following.

Although the syntax is written in an MPEG-2 private section format for better understanding, the data may be in any format. For example, it is possible to use another method in which the syntax is expressed in a Session Description Protocol (SDP) format and is then signaled through a Session Announcement Protocol (SAP).

In FIG. 10 and FIG. 15, a table_id field includes an 8-bit unsigned integer number that indicates the type of table section being defined in NRT Service Table (NST).

A section_syntax_indicator field is a 1-bit field that shall be set to '0' to always indicate that this table is derived from the "short" form of the MPEG-2 private section table.

A private_indicator field (1-bit) indicates whether the type of the corresponding section follows the private section type or not. (This field that shall be set to '1')

A section_length is a 12-bit field. It specifies the number of remaining bytes this table section immediately following this field. The value in this field shall not exceed 4093 (0xFFD)).

A table_id_extension field is a 16-bit field and is table-dependent. It shall be considered to be logically part of the table_id field providing the scope for the remaining fields. The table_id_extension field includes NST_protocol_version fields.

The NST_protocol_version field is an 8-bit unsigned integer field whose function is to allow, in the future, this NST to carry parameters that may be structured differently than those defined in the current protocol. At present, the value for the NST_protocol_version shall be zero. Non-zero values of NST_protocol_version may be used by a future version of this standard to indicate structurally different tables.

A version_number field (5-bit) indicates the version number of the NST.

A current_next_indicator field is a one-bit indicator, which when se to '1' shall indicate that the NST sent is currently applicable. When the bit is set to '0', it shall indicate that the table sent is not yet applicable and will be the next table to become valid. This standard imposes no requirement that "next" tables (those with current_next_indicator set to '0')

must be sent. An update to the currently applicable table shall be signaled by incrementing the version_number field).

A section_number is an 8-bit field that shall give the section number of this NST section. The section_number of the first section in an NST shall be '0x00'. The section_number shall be incremented by 1 with each additional section in the NST.

A last_section_number is an 8-bit field that shall give the number of the last section (i.e., the section with the highest section_number) of the NST of which this section is a part).

A num_NRT_services field is an 8-bit field that specifies the number of services in this NST section.

A 'for' loop, which is also referred to as an "NRT service loop", is executed for the number of times as the number of NRT services corresponding to the num_NRT_services field value in providing signaling information of a plurality of NRT services. Thus, signaling information of the corresponding NRT service is indicated for each of the NRT services included in the NST section. Here, the following field information may be provided for each NRT service.

An NRT_service_id field is a 16-bit unsigned integer number that shall uniquely identify this NRT service within the scope of this NRT section. The NRT_service_id field of a service shall not change throughout the life of the service. To avoid confusion, it is recommended that if a service is terminated, then the NRT_service_id field for the service should not be used for another service until after a suitable interval of time has elapsed.

An NRT_service_status field is a 2-bit enumerated field that shall identify the status of this NRT Service. The most significant bit shall indicate whether this NRT Service is active (when set to '1') or inactive (when set to '0') and the least significant bit shall indicate whether this NRT Service is hidden (when set to '1') or not (when set to '0'). Hidden services are normally used for proprietary applications, and ordinary receiving devices should ignore them.

A SP_indicator field is a 1-bit field that indicates when set to 1, service protection is applied to at least one of the components needed to provide a meaningful presentation of this NRT Service.

A Short_NRT_service_name_length field (3-bit) instructs the number of byte pairs within the Short_NRT_service_name field.

A Short_NRT_service_name filed (16*m bit) indicates a short name of the NRT service. This field may be filled with null data (for example, 0x00) when the NRT service has no short name.

An NRT_service_category field is a 6-bit enumerated type field that shall identify the type of service carried in the NRT.

A num_components field is a 5-bit field that specifies that number of IP stream components in this NRT Service.

An IP_version_flag is a 1-bit indicator, which when set to '0' shall indicate that source_IP_address, NRT_service_destination_IP_address, and component_destination_IP_address fields are IPv4 addresses. The value of '1' for this field is reserved for possible future indication that source_IP_address, NRT_service_destination_IP_address, and component_destination_IP_address fields are for IPv6.

A source_IP_address_flag field is a 1-bit Boolean flag that shall indicate, when set, that a source IP address value for this NRT Service is present to indicate a source specific multicast.

An NRT_service_destination_IP_address_flag field is a 1-bit Boolean flag that indicates, when set to '1', that an NRT_service_destination_IP_address field value is present, to serve as the default IP address for the components of this NRT Service.

A source_IP_address field is a 32 or a 128 bit field that shall be present if the source_IP_address_flag field is set to '1' and shall not be present if the source_IP_address_flag field is set to '0'. If present, this field shall contain the source IP address of all the IP datagrams carrying the components of this NRT Service. The conditional use of the 128 bit-long address version of this field is to facilitate possible use of IPv6 in the future, although use of IPv6 is not currently defined.

An NRT_service_destination_IP_address field is a 32 or a 128 bit field that shall be present if the NRT_service_destination_IP_address_flag field is set to '1' and shall not be present if the NRT_service_destination_IP_address field is not present, then the component_destination_IP_address field shall be present for each component in the num_components loop. The conditional use of the 128 bit-long address version of this field is to facilitate possible use of IPv6 in the future, although use of IPv6 is not currently defined.

A 'for' loop, which will also be referred to as a "component loop," is executed as much as the number of times as the number of components corresponding to the num_components field value to provide access information of a plurality of components. This provides access information of each component included in the NRT service. Here, the following field information may be provided for each component. In an embodiment, one component corresponds to one FLUTE session.

An essential_component_indicator field is a 1-bit indicator which, when set to '1', shall indicate that this component is an essential component for the NRT Service. Otherwise, this field indicates that this component is an optional component.

A port_num_count field is a 6-bit field that shall indicate the number of destination UDP ports associated with this UDP/IP stream component. The values of the destination UDP port numbers shall start from the component_destination_UDP_port_num field and shall be incremented by one.

A component_destination_IP_address_flag field is a 1-bit Boolean flag that shall indicate, when set to '1', that the component_destination_IP_address field is present for this component.

A component_destination_IP_address field (32 or 128 bit) shall be present if the component_destination_IP_address_flag field is set to '1' and shall not be present if the component_destination_IP_address_flag field is set to '0'. When this field is present, the destination address of the IP datagrams carrying this component of the NRT Service shall match the address in this field. When this field is not present, the destination address of the IP datagrams carrying this component shall match the address in the NRT_service_destination_IP_address field. The conditional use of the 128 bit-long address version of this field is to facilitate possible use of IPv6 in the future, although use of IPv6 is not currently defined.

A component_destination_UDP_port_num field is a 16-bit unsigned integer field that represents the destination UDP port number for this UDP/IP stream component.

A num_component_level_descriptors field (4-bit) indicates the number of descriptors providing the additional information of the component level.

The same number of the component_level_descriptor( ) is included in the component loop providing additional information as the number of the field value of the num_component_level_descriptors.

A num_NRT_service_level_descriptors field (4-bit) indicates the number of descriptors that provide additional information about the NRT service level.

The same number of the NRT_service_level_descriptor( ) are included in NRT service loop as the number of the field value of num_NRT_service_level_descriptors to provide additional information about the NRT service.

A num_virtual_channel_level_descriptors field (4-bit) indicates the number of descriptors which provides additional information about the virtual channel level.

The same number of virtual_channel_level_descriptor( ) included in the virtual channel loop as the number of the field value of the num_virtual_channel_level_descriptors to provide additional information of the virtual channel.

FIG. 12 illustrates an embodiment of a bit stream syntax structure of a component_level_descriptors( ). The component_descriptor( ) is used as one of the component level descriptor component_level_descriptors( ) of the NST and describes additional signaling information of the corresponding component.

The following is a description of each field of the component_descriptor( ).

In FIG. 12, a descriptor_tag field (8-bit) is a descriptor identifier and it can be set as an identifier that identifies the component_descriptor( ).

A descriptor_length field (8-bit) describes the remaining length of the descriptor starting after the descriptor_length field and to the end of this descriptor, in bytes.

A component_type field (7-bit) shall identify the encoding format of the component. The value may be any of the values assigned by IANA for the payload_type of an RTP/AVP stream, or it may be any of the values assigned by ATSC, or it may be a "dynamic value" in the range 96-127. For components consisting of media carried via RTP, the value of this field shall match the value in the payload_type field in the RTP header of the IP stream carrying this component. Note that additional values of the component_type field in the range of 43-71 can be defined in future versions of this standard.

A component_encryption_flag (1-bit) informs whether the corresponding component is encrypted or not.

A num_STKM_streams field (8-bit) indicates the number STKM streams if component_encryption_flag has been encrypted. The num_STKM_streams field is an 8-bit unsigned integer field that shall identify the number of STKM streams associated with this component.

A STKM_stream_id field (8-bit) is repeated as much as the field value of Num_STKM_streams and indicates a value that identifies a STKM stream that can acquire a key required for decryption.

An NRT_component_data (component_type) element provides the encoding parameters and/or other parameters necessary for rendering this component. The structure of the component_data is determined by the value of component_type field.

For example, if the component_type field value is 35 then NRT_component_data (component_type) field provides component data for H.264/AVC video stream.

In another example, if the component_type field value is 38 then NRT_component_data (component_type) field provides data for FLUTE file delivery as shown in FIG. 13.

One NRT service can be included in multiple FLUTE sessions. Thus, one NRT service may be configured with plurality of FLUTE sessions. Each FLUTE session may be signaled using NRT_component_data( ) as shown in FIG. 13.

FIG. 13 illustrates an example of the bit stream syntax structure of NRT_component_data( ) that provides data for FLUTE file delivery according to the present invention. The following explains each field in the NRT_component_data( ).

A TSI field (16-bit unsigned integer) shall be the Transport Session Identifier (TSI) of FLUTE session.

A session_start_time field (16-bit) indicates the start time of the FLUTE session. If the field values are all '0', then it can be interpreted that the FLUTE session has already begun.

A session_end_time field (16-bit) indicates the end time of the FLUTE session. If the field values are all '0,' then it can be interpreted that the FLUTE session continues for unlimited amount of time.

A tias_bandwidth_indicator field (1-bit) flags the inclusion of TIAS bandwidth information. This bit shall be set to '1' to indicate the TIAS bandwidth field is present, and it shall be set to '0' to indicate the TIAS bandwidth field is absent.

An as_bandwidth_indicator field (1-bit) flags the inclusion of AS bandwidth information. This bit shall be set to '1' to indicate the AS bandwidth field is present, and it shall be set to '0' to indicate the AS bandwidth field is absent.

A FEC_OTI_indicator field (1-bit) indicates whether FEC Object Transmission Information is provided.

A tias_bandwidth field (16-bit) exists when the as_bandwidth_indicator field value is set to '1' and it indicates the maximum bandwidth. Also, it shall be one one-thousandth of the Transport Independent Application Specific maximum bandwidth as defined in RFC 3890, rounded up to the next highest integer if necessary. This gives the TIAS bandwidth in kilobits per second.

An as_bandwidth field (16-bit) exists when the as_bandwidth_indicator field value is set to '1' and it indicates the maximum AS bandwidth. Also, this value shall be the Application Specific maximum bandwidth as defined in RFC 4566. This gives the AS bandwidth in kilobits per second.

A FEC_encoding_id field exits when the FEC_OTI_indicator field value is set to '1' and indicates FEC ID used in corresponding FLUTE session. (FEC encoding ID used in this FLUTE session, as defined in RFC 3926).

A FEC_instance_id field exists when the FEC_OTI_indicator field value is set to '1' and indicates FEC instance ID used in the corresponding FLUTE session. (FEC instance ID used in this FLUTE session, as defined in RFC 3926).

The information necessary to receive FLUTE session is provided by signaling the parameters through the NRT_component_data( ) of the component_descriptor( ) within the component loop.

In other words, according to the time information set by the session_start_time field and the session_end_time field, the corresponding FLUTE session is opened and files and the FDT (File Description Table) that describes the signaling information of the files that configures NRT service (or content) is received. The FDT is used to transmit the list of all the content items, and also provides information necessary in acquiring content item and the files included in the content item.

The FDT includes file id which is the only identifier for identifying files included in the content item and instance id which is the only identifier for identifying the corresponding FDT. Moreover, a content linkage which identifies the content item corresponding to the FDT file level or instance level, may be allocated.

For example, each file that configures the content item can be identified through content linkage, TOI, and Content-Location field described in the FDT of the FLUTE session. In the present invention, the content linkage, TOI, and the Content-Location field is referred as the file identifier.

Also, as described above, the present invention uses service_type field of the signaling table (example: VCT) to verify that the NRT service is received through the corresponding virtual channel when receiving Fixed NRT service in a terrestrial broadcast environment.

For example, in case of Fixed NRT service, as illustrated in FIG. 5 or FIG. 6, if the service type of the VCT is 0x02 (indicating that it is digital Audio/Video/Data), 0x04 (indicating that it is Data only), or 0x08 (indicating that it is NRT Only service), it is determined that the NRT service stream is received through the virtual channel.

However, it is difficult to deal with various use case of NRT with just the service type fields described above.

Therefore, the present invention transmits signaled service information including the service type (or application type) information and the detailed information of the service type of the NRT service and control the handling of the corresponding NRT service (or content).

In other words, there exists use case of NRT service such as targeted advertisement, music download, push VOD, and alike, and various storage and playback scenarios according to the various codec combination and the connected hardware module inside the broadcast receiver according to the use case. In the present invention, using the service information including service type and detailed information about the service, it is able to efficiently handle the NRT service or the content configuring the corresponding NRT service. Further, it is possible to use the service to determine whether it is possible to handle the corresponding NRT service before receiving and storing in storage the NRT service.

For example, a broadcast receiver may determine the method of processing the corresponding NRT service using the service information. Further, using the service information it is possible to determine how the NRT service will be provided to the users and also the operation of the associated application module can be determined.

In the present invention, service information in order to control the NRT service is provided to the broadcast receiver.

The service information may be included as a field or as a descriptor in the signaling information table.

In an embodiment, in case of Fixed NRT service, the service information may be included as a field or as a descriptor in any one of NST or NRT-IT.

In an embodiment, when the service information is included in the NST as a descriptor format, the service information is included as one of service level descriptor of the NST. In such as case, the service information is individually applied in NRT service.

In an embodiment, when the service information is included in the NRT-IT as a descriptor format, the service information is included in the NRT-IT as a content level descriptor. In such a case, the service information is individually applied to the content (or content item).

For example, assuming that one NRT service is configured in content 1 and content 2, if the service information is included in NST, the service information is applied to content 1 and 2 configuring the NRT service at the same time. In the other hand, if the service information is included in the NRT-IT, the service information is applied to either one of content 1 and content 2.

In the present invention, for the convenience of explaining the descriptor describing the service information, it is referred to as NRT_service_info_descriptor( ).

In another embodiment of the present invention, the NRT service information descriptor may be included in the announcement table of the NRT service. At this point, the NRT service information descriptor must be linked with the corresponding NRT service.

FIG. 14 illustrates a bit stream syntax of NRT_service_info_descriptor( ) according to an embodiment of the present invention.

The detail explanation of each fields of NRT_service_info_descriptor( ) are as follows.

The explanation follows a situation where the NRT_service_info_descriptor( ) is included in the service level descriptor of the NST.

In FIG. 14, a descriptor_tag field (8-bit) is a descriptor identifier that can be set to identify NRT_service_info_descriptor( ).

A descriptor_length field (8-bit) indicates the remaining length of descriptor from after the descriptor_length field to the end of descriptor in byte.

An application_type field (8-bit) indicates a detailed application type of the corresponding NRT service.

FIG. 15 illustrates an example of the meaning of the application_type field defined.

For example, if the application_type field value is 0, the corresponding NRT service indicates that it is a video/audio clip. Thus, the video/audio clime is a Pull-type and means that download is done through the user selecting the NRT service in the guide or channel browsing process.

If the application_type field value is 1, it means that the corresponding NRT service is a service that is updated frequently. Thus, the frequently updated NRT service means that it is a service where frequent download and replace is possible without storing the service for a long time such as News, Information, and Weather service.

If the application_type field value is 2, then it means that the corresponding NRT service is a Music Distribution. The Music Distribution means that it is an audio-only service.

If the application_type field value is 3, then it means that the corresponding NRT service is a Targeted Advertisement. The Targeted Advertisement is a play back service triggered by a specific signal or a specific rule of the inside of the broadcast receiver transmitted by the service provider after the broadcast receiver has previously received in non-real time and stored in storage media. As an example, the targeted advertisement cannot be deleted randomly by the broadcast receiver and may be executed in a file management (delete, update) through the broadcaster or the service provider.

If the application_type field value is 4, then it means that the NRT service includes Applications Data. The NRT service using the applications data means that it a service such as application software or executable command set and not A/V content such as a game.

If the application_type field is 5, then it means that the NRT service is a Private/Subscription-based Service. The private/subscription-based service is a video content of Push-type. Thus, the NRT service using the video content is a method where the broadcast receiver automatically downloads the corresponding content based on set of rules based on the subscriber's preference.

If the application_type field value is 6, it means that the NRT service includes Text Data. The NRT service using the text data means that is a document or a subtitle format service.

If the application_type field value is 7, then it means that the corresponding NRT service includes File Management Data. The file management data includes command data such as parameter information and file delete or move of renewing the expiry date of a file or other files.

If the application_type field value is 8, then it means that the corresponding NRT service is Web content. The web content means that it has the data configuration for having the same interface as if the website/portal is accessed through the NRT service. The web content includes data configured in HTML, JPEG document, and the like.

If the application_type field value is 9, then it means that the corresponding NRT service is still image. The still image means still images such as JPEG, GIF, Bitmap and the like.

If the application_type field value is 10, then it means that the NRT service is Maintenance data. The Maintenance data includes key values such as software/firmware upgrade, administrative message from the service provider, subscription information associated with the service, and content protection of the broadcast receiver.

The information included in the application_type field is only an embodiment to explain the present invention, and the present invention is not limited to the embodiment as the one skilled in the ordinary art can alter to add or delete the information included.

The user_control_flag field (1-bit) in FIG. 14 indicates whether the user can randomly execute commands (deletion, move, or update) of a file or file access when the content provided through the NRT service is stored in the broadcast receiver. In an embodiment, if the user_control_flag field value is 1, then the service provider has the authority to control and access the file and the user does not have such authority. Targeted advertisement and service provider maintenance message can be examples. And in an embodiment, if the user_control_flag field value is 0, then it means that the user has the authority to access and control the corresponding file. In a different embodiment, both the user and the service provider can have authority to access and control the file. In an embodiment to override the field, changing the authority of the NRT content stored in the storage can be performed through the maintenance data.

A storage_requirement field (31-bit) indicates a size of content provided through the NRT service in byte.

A num_video_elements field (4-bit) indicates a number of different video codec types when the content configuring NRT service uses different video codec.

A num_audio_elements field (4-bit) indicates a number of different audio codec types when the content configuring NRT services uses different audio codec.

The 'for' loop is executed for the number of video codec assigned to the num_video_elements field value to provide the corresponding video_codec_type and the 'for' loop is executed for the number of audio codec assigned to the num_audio_elements field value to provide the corresponding audio_codec_type.

An encapsulation_type field (8-bit) indicates encapsulation format used for multiplexing audio/video stream. In an embodiment, the formats of encapsulation may include MPEG-2 system and MPEG-4 system.

A web_content_type field (8-bit) indicates a value to determine the compatibility of the web browser when the application_type field value is 8 meaning that it is a web content. As an example, the web_content_type field may include the existence of flash, XML version, HTML version, and the like. In this case, it is known whether the web content (or web document) is written in XML or HTML. For example, according to the web_content_type field if the corresponding web content is a HTML document and was written in HTML 4.01, then the web_content_type field indicates that value corresponding to HTML 4.01. In another example, if the web document cannot be viewed in versions earlier than IE 7.0, the web_content_type field may be used to notify it beforehand.

Thus, the broadcast receiver can find out what browser is compatible through the web_content_type field. Also, based on web_content_type field, the broadcast receiver can find out whether the web content provided through NRT service is supported by the web browser within the broadcast receiver.

An expiration_type field (8-bit) indicates the type of expiration period of the corresponding NRT service when NRT service is stored. Depending upon the expiration_type field value, the interpretation of the expiration_value field value, which comes after, is changed.

For example, if the expiration_type field value indicates expiration control by number of playbacks, the expiration_value field value represents the number of playbacks. Thus, the corresponding NRT service storage control is executed depending on the number of playbacks.

If the expiration_type field value indicates expiration control by date, the expiration_value field value represents the date and time information. Thus, the corresponding NRT service expiration is managed when specific time is specified.

If the expiration_type field does not indicate the expiration control value of the expiration period, then there is no meaning for the expiration_value field value. In an embodiment, if there is no specific expiration period to be set, the expiration_value field value is 0. In another embodiment, if the expiration_value field value is 0, it can be interpreted that there is no expiration and the expiration_type field is not used.

A controlled_rendering_flag field (1-bit) indicates whether the corresponding data provides display control information when the video is outputted in the NRT service. If the controlled_rendering_flag field value is 1, then in an embodiment, it indicates that display control information is provided on the corresponding data.

In the present invention, the NRT service may be provided as a full screen or as a sub-screen. Here, the Sub-screen means that it is smaller than a full screen and it can mean Picture In Picture (PIP), Picture Of Picture (POP), double window screen, and the like.

In an embodiment of the present invention, controlled_rendering_flag field is used to direct whether the corresponding NRT service is provided in full screen or as a sub-screen.

In an embodiment, if the NRT service is provided in full screen, the controlled_rendering_flag field value is set to '0,' and when it is provided in sub-screen the controlled_rendering_flag field value is set to '1.' In an embodiment of the present invention, if the controlled_rendering_flag field value is '1,' and the corresponding NRT service is played, the control of the video output follows the display control information provided by the current NRT_service_info_descriptor( ).

And according to an embodiment, if the controlled_rendering_flag field value is set to '1,' using the target_window_position_horizontal field, target_window_position_vertical field, target_window_length_horizontal field, and target_window_length_vertical field, the display control information is provided. Thus when the NRT service is displayed on the screen, the position and size information is provided.

The target_window_position_horizontal field (16-bit) and target_window_position_vertical field (16-bit) indicates the horizontal and vertical coordinates of the video output display of the corresponding NRT service. For example, the target_window_position_horizontal field value and target_window_position_vertical field value indicates top leftmost pixel position of the video output.

The target_window_length_horizontal field (16-bit) and target_window_length_vertical field (16-bit) indicates the horizontal and vertical size of the window displayed by the video output in pixel. Thus, it indicates the horizontal/vertical size of the sub-screen to be displayed by the NRT service.

FIG. 16 illustrates an embodiment of concurrent display function of the broadcast receiver according to the present invention. According to an embodiment, the sub-screen in the concurrent display is a PIP screen.

As an example, the display may indicate as FIG. 16(a) where both the main screen and the sub-screen display RT service or as indicated by FIG. 16(b), where the main screen displays RT service and the sub-screen displays NRT service. Also, as indicated by FIG. 16(c), the main screen may display NRT service and the sub-screen may display RT service. Finally, as shown in FIG. 16(d), both the main and sub screen may display NRT service.

If the corresponding NRT service is displayed in the sub-screen as illustrated by FIG. 16(b) or (d), according to the present invention the controlled_rendering_flag field value is set to '1,' and target_window_position_horizontal field, target_window_position_vertical field, target_window_length_horizontal field, and target_window_length_vertical field are used to provide the display control information. Thus, the target_window_position_horizontal field, target_window_position_vertical field, target_window_length_horizontal field, and target_window_length_vertical field provides the position and the size of the sub-screen when the NRT service is displayed.

Further, when the corresponding NRT service is displayed in the main screen as illustrated by FIG. 16(c) or (d), according to the present invention, the controlled_rendering_flag field value is set to '0,' and the display control information is not provided.

In addition, according to the present invention, input devices such as remote control, menu screen, touch, or the like can be used to switch the NRT service displayed in a sub-screen to a full screen.

For example, using the main/sub switch key in the remote control, the NRT service displayed in sub-screen can be displayed in full screen. When the main/sub switch key is depressed once more, the NRT service displayed in full screen will get switched back to displaying in sub-screen.

In another example, it is possible to display NRT service displayed in sub-screen to full screen or from full screen to sub-screen by allocating menu (icon, or button) in a specific location within the displayed screen and using a remote control to select the menu.

In another example, it is possible to switch main/sub screen by touching the sub-screen.

Therefore, when RT service and NRT service is provided on a same screen, switching main/sub screen using a remote control, menu screen, touch, or the like is possible.

Figure 17:
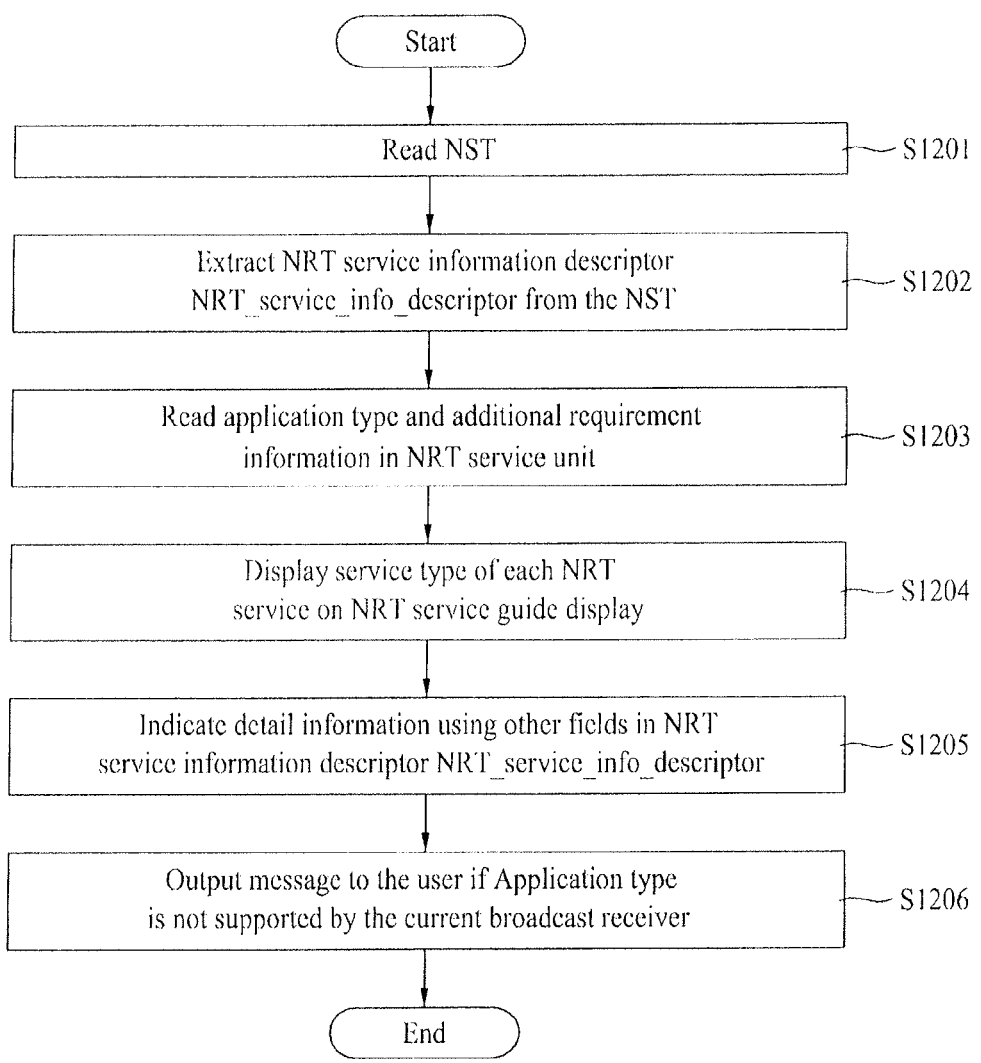
FIG. 17 illustrates a flowchart processing NRT service using the service information according to the present invention.

FIG. 17 illustrates a flowchart of the process handling and acquiring NRT_service_info_descriptor( ) from NST according to the present invention.

First of all, NST is extracted using the table identifier from the NRT service signaling channel. [S1201] And the NRT_service_info_descriptor is extracted from the NRT service loop of the NST as illustrated in FIG. 14. [S1202] and the service information of the corresponding NRT service are acquired. [S1203] These processes will allow receiving application type and other requirement information in each NRT service unit by executing all NRT service described in the NST. For example, if 2 NRT service is described in the NST, application type and additional requirement information can be acquired from the 2 NRT service (NRT service 1, NRT service 2).

By executing [S1203], the service type of each NRT service is outputted in the NRT service guide display. For example, if the application_type field value of the NRT service 1 is 0, it indicates that NRT service 1 is ordinary audio/video clip. Also using the other fields of NRT_service_info_descriptor( ) of NRT service 1, the detail information of NRT service 1 is indicated. [S1205] For example, capacity, authority information, codec information, encapsulation format information, expiration period of the NRT service 1 may be indicated. Further, when the NRT service is displayed on the screen, if the controlled_rendering_flag field value is '1,' the NRT service 1 is displayed on the sub-screen based on target_window_position_horizontal field, target_window_position_vertical field, target_window_length_horizontal field, and target_window_length_vertical field.

If the application type of the NRT service 1 is not currently supported by the broadcast receiver On Screen Display (OSD) message is outputted so that the corresponding user can find out.

Also, when the application type is Maintenance Data or Targeted Advertisement then download can be achieved without user interruption, so it can be omitted when outputting the NRT service guide.

FIGS. 18 and 19 illustrate a bit stream syntax of NRT-IT section that includes the detailed information of the content according to the present invention.

The bit-stream syntax of the NRT-IT section is described in MPEG-2 Private section format for ease of understanding the bit-stream syntax of the NRT-IT section, but the format of the data can be in other formats as well. For example, signaling through Session Announcement Protocol (SAP) described by Session Description Protocol (SDP) type is also possible.

The NRT-IT in the NRT service signaling data according to the present invention includes information describing the downloadable content item needed in order to store the content item in the broadcast receiver. The information provided in the NRT IT includes the title of the content (for example, the name of the program available for download), the times during which the content is to be made available for download, and information such as content advisories, availability of caption services, content identification, and other metadata. One item of content may consist of one or more files. For example, an audio/video clip may come with a JPEG thumbnail image that can be used to represent it in on-screen displays. The NRT-IT is used to provide information for virtual channels of service_type values 0x08.

An instance of the NRT-IT can include data corresponding to an arbitrarily defined time period, or can describe NRT content starting at a specified time and into the indefinite future. Each NRT-IT instance indicates the start time of the period it covers and the length of the period it covers (which may be indefinite). Each NRT-IT instance may be segmented into as many as 256 sections. One section may contain information for multiple content items, but the information for any given content item shall not be segmented and put into two or more sections.

Any content item to be made available for download for a time interval that extends beyond the time period covered one or more NRT-IT instances shall be described only in the first of these NRT-ITs. Content item descriptions are placed within the NRT_information_table_section( ) in the order of their first availability. Therefore, when last_section_number is greater than zero (meaning the NRT-IT is delivered in multiple sections), for sections other than the first (sections for which the value of section_number is greater than zero), all the content item descriptions within a given section shall have first availability times that are greater than or equal to all first availability times of content item descriptions in the immediately preceding section (the section whose value of section_number is one lower than the given section).

Each NRT-IT identifies NRT services associated with the given value of service_id available on a particular virtual channel sometime during the time period it covers.

Here, is possible to find out whether one NRT-IT is made up with one section or plurality of sections through table_id field, section_number field, last_section_number field in the NRT-IT section. The corresponding table is completed by gathering sections having same table identifier after deleting IP header and UDP header of IP datagram in the NRT service signaling channel. Fort example, by gathering sections identifying the table allocated to NRT-IT, NRT-IT is completed.

The detailed description of the NRT-IT section fields illustrated in FIGS. 18 and 19 are described below.

A Table_id field (8-bit) is set to 0xTBD to identify this table section as belonging to the Non-Real-Time Information Table.

A service_id field (16-bit) specifies the service_id field associated with the NRT service offering content items described in this section.

An NRT_IT_version_number field (5-bit) indicates the version number of this NRT-IT instance, where NRT-IT instance is defined as the set of one or more NRT_information_table_section( ) having common values for service_id field, current_next_indicator field, protocol_version field, and time_span_start field. The version number is incremented by 1 modulo 32 when any field in the NRT-IT instance changes.

A current_next_indicator (1-bit) field is always set to '1' for NRT-IT sections; the NRT-IT sent is always currently applicable.

A protocol_version field (8-bit) is set to zero. The function of protocol_version field is to allow, in the future, this table type to carry parameters that may be structured differently than those defined in the current protocol. At present, the only valid value for protocol_version field is zero. Non-zero values of protocol_version field may be used by a future version of this standard to indicate structurally different tables.

A time_span_start field (32-bit) represents the start of the time span covered by this instance of the NRT-IT, expressed as the number of GPS seconds since 00:00:00 UTC, Jan. 6, 1980. The time of day of time_span_start field is aligned to minute 00 of the hour. The value zero for time_span_start field indicates the time period covered by his NRT-IT instance began in the indefinite past. The value of time_span_start field is the same for each section of a multi-sectioned NRT-IT instance. The values of time_span_start field and time_span_length field are set such that the specified time span does not overlap with any other NRT-IT instance in this IP subnet.

A time_span_length field (11-bit) indicates the number of minutes, starting at the time indicated by time_span_start field, covered by this instance of the NRT-IT. Once established, the value of time_span_length field for a given value of time_span_start field does not change. A value of time_span_length field of zero means this NRT-IT instance covers all time starting at time_span_start field into the indefinite future. If the value of time_span_start is zero, time_span_length field has no meaning. The value of time_span_length field is the same for each section of a multi-sectioned NRT-IT instance. The values of time_span_start field and time_span length field are set such that the specified time span does not overlap with any other NRT-IT instance in this IP subnet.

A num_items_in_section field (8-bit) indicates the number of content items described in this NRT-IT section.

The 'for' loop (also referred to as item loop) is executed for number of content items corresponding to the field value of the num_items_in_section and provides signaling information about plurality of content items. Thus, the signaling information of the content item of each content item included in the NRT service corresponding to the NRT_service_id field value is indicated. The following describes the field in each content item that may provide the information.

A content_linkage field (32-bit) in the range 0x0001 to 0xFFFF specifies the identification number of the content (or content item) described. Value 0x0000 is not used. The content_linkage field performs two linkage functions: it links metadata in the NRT-IT to one or more files in the FLUTE FDT associated with this NRT service; it also forms the TF_id field (identifier for Text Fragment in Text Fragment Table). The value of the content_linkage field corresponds to either the value of one of the FDT-Content-Linkage elements or the value of one of the File-Content-Linkage elements in the FLUTE FDT for each file associated with the content item. The precedence rules may be applied when matching each content_linkage value with the corresponding content linkage elements in the FLUTE FDT.

An updates_available field (1-bit) specifies, when set to '1,' that the referenced content item(s) will be updated. When the updates_available field is set to '0,' updates are not expected to be provided for the associated content item(s), and broadcast receivers are not expected to look for them.

A TF_available field is Boolean flag, this field specifies, when set to '1' that a Text Fragment is present in a Text Fragment Table in the service signaling channel. When the field is set to '0,' no Text Fragment is included in the service signaling channel for this content item.

A low_latency field is Boolean flag, this field specifies, when set to '1,' that the content is available within the current digital transport with a low enough latency that its retrieval should be attempted while the user waits. When the field is set to '0', retrieval latency is longer and the user interface should suggest to the user to return later for viewing.

A playback_length_in_seconds field (20-bit) specifies the duration of playback of the content, in seconds. For content consisting only of text and/or still images, the value zero is used. For content that includes audio or audio/video content, the playback_length_in_seconds field indicates the playback length of the audio or audio/video content.

A content_length_included field is Boolean flag, this field indicates, when set to '1,' that the content_length field is present in this iteration of the "for" loop. Setting this field to '0' indicates the content_length field is not present in this iteration of the "for" loop.

A playback_delay_included field is Boolean flag, this field indicates, when set to '1,' that the playback_delay field is present in this iteration of the "for" loop. Setting this field to '0' indicates the playback_delay field is not present in this iteration of the "for" loop.

An expiration_included field is Boolean flag, this field indicates, when set to '1,' that the expiration field is present in this iteration of the "for" loop. Setting this field to '0' indicates the expiration field is not present in this iteration of the "for" loop.

A duration field (12-bit) in the range 1 to 2880 specifies the expected cycle time, in minutes, of the carousel containing the referenced content item. A broadcast receiver is expected to use the duration parameter to determine the amount of time needed to capture the referenced content.

A content_length field (40-bit), when present, represents the total size in bytes of the content item or items. This item is used by the broadcast receiver to determine if enough memory is available to store it before downloading is attempted.

A playback_delay field (20-bit) counts of the number of seconds following reception of the first byte of the associated content the broadcast receiver waits before playback may start, while buffering the incoming stream. A value of zero indicates playback may commence immediately. When playback_delay field is not provided, the broadcast receiver is expected to retrieve the complete file or file set prior to playback.

An expiration field (32-bit) represents the expiration time of the content, expressed as the number of GPS seconds since 00:00:00 UTC, Jan. 6, 1980. Following expiration, the content is deleted from memory. If an expiration time is not specified, broadcast receivers are expected to use methods of their own choosing to manage memory resources.

A content_name_length field (8-bit) specifies the length (in bytes) of the content_name_text( ).

A content_name_text( ) field specifies the content item title in the format of a multiple string structure.

A content_descriptors_length field (12-bit) indicates the total length (in bytes) of the content_descriptor( ) that provide additional information about the content level.

A content_descriptor( ) is separately applied to each content item.

A descriptors_length field (10-bit) indicates the total length (in bytes) of the descriptor ( ).

A descriptor( ) is commonly applied to all content items described in the current NRT-IT section.

The NRT_service_info_descriptor( ) illustrated in FIG. 14 may be included as one of the content_descriptor( ) of NRT-IT illustrated in FIGS. 18 and 19.

If the NRT_service_info_descriptor( ) is included in NRT-IT as a descriptor format, the NRT_service_info_descriptor( ) is separately applied to content (or content item).

For example, if one of NRT service is configured in content 1 and content 2, the NRT_service_info_descriptor( ) is applied to either one of content 1 or content 2. As an example, if the NRT_service_info_descriptor( ) is included in content item loop describing content 2, the service information described in NRT_service_info_descriptor( ) is applied to content 2.

The following explains how NRT_service_info_descriptor( ) in FIG. 14 and application type information in FIG. 15 is applied in content 2.

An application_type field (8-bit) indicates a detailed application type of content 2.

For example, if the application_type field value is 0, then content 2 indicates that it is a video/audio clip.

If the application_type field value is 1, then it indicates that content 2 is frequently updated content.

If the application_type field value is 2, then it indicates that content 2 is a Music Distribution.

If the application_type field value is 3, then it indicates that content 2 is a Targeted Advertisement.

If the application_type field value is 4, then it indicates that content 2 is an Applications Data.

If the application_type field value is 5, then it indicates that content 2 is a Private/Subscription-based Content.

If the application_type field value is 6, then it indicates that content 2 is a Text Data.

If the application_type field value is 7, then it indicates that content 2 is a File Management Data.

If the application_type field value is 8, then it indicates that content 2 is Web content.

If the application_type field value is 9, then it indicates that content 2 is a still image.

If the application_type field value is 10, then it indicates that content 2 is a Maintenance data.

The user_control_flag field (1-bit) indicates whether file, configuring the content 2, can be randomly altered by the user for access and command (deletion, move, update) when content 2 is stored in the broadcast receiver.

The storage_requirement field (31-bit) indicates the size of content 2 in byte.

The num_video_elements field (4-bit) indicates the number of different video codec types when video codec included in content 2 uses different video codec.

The num_audio_elements field (4-bit) indicates the number of different audio codec types when audio codec included in content 2 uses different audio codec.

The 'for' loop is executed for the number of video codec indicated by the num_video_elements field value to provide the video_codec_type, and the 'for' loop is executed for the number of audio codec indicated by the num_audio_elements field value to provide the audio_codec_type.

The encapsulation_type field (8-bit) indicates the encapsulation format used to multiplex the audio/video stream of content 2.

The web_content_type field (8-bit) indicates the value to determine the compatibility of the web browser when the application_type field value is 8, meaning that it is web content.

The expiration_type field (8-bit) indicates the type of the expiration period of content 2, when content 2 is stored. Depending on the value represented by the expiration_value field which follows the expiration_type field value, the interpretation is different.

For example, if the value of Expiration control by number of playbacks is indicated by the expiration_type field value, then the expiration_value field value indicates the number of playbacks. Thus depending on the number of playbacks, the storing control for content 2 is executed.

If the value of Expiration control by date is indicated by the expiration_type field value, then the expiration_value field value indicates the date and time information. Thus, it indicates a specific time to control the expiration period of content 2.

If there is no value indicated for the Expiration control in the expiration_type, the expiration_value field value has no meaning. According to an embodiment of the present invention, if there is no specific expiration date set, the expiration_value field value is 0. In another embodiment, it may be interpreted that there is no expiration if expiration_value is 0 and the expiration_type field is not used.

A controlled_rendering_flag field (1-bit) indicates whether the display control information of the corresponding data is provided when video of content 2 is outputted. According to an embodiment, if the controlled_rendering_flag field value is '1,' then it indicates that the display control information for the corresponding data is provided.

According to the present invention, content 2 can be provided in a full screen or in a sub-screen. Here, the sub-screen means that it is a smaller screen than a full screen and PIP, POP, double window screen are examples of sub-screen. According to an embodiment of the present invention, assuming that NRT service includes content 1 and content 2, content 1 and content 2 are concurrently displayed in one screen.

According to the present invention, whether content 2 is provided in full screen or in sub-screen is determined by the controlled_rendering_flag field.

In an embodiment, if content 2 is provided in full screen, the controlled_rendering_flag field value is set to '0' and the controlled_rendering_flag field value is set to '1' if it is provided in sub-screen. According to an embodiment of the present invention, if the controlled_rendering_flag field value is '1,' then when playing content 2, the control of the video output will follow the information provided by current NRT_service_info_descriptor( ).

In an embodiment, if the controlled_rendering_flag field value is set to '1,' then the display control information is provided using the target_window_position_horizontal field, target_window_position_vertical field, target_window_length_horizontal field, and target_window_length_vertical field. Thus it provides the location and the size of the screen when content 2 is displayed.

The target_window_position_horizontal field (16-bit) and target_window_position_vertical field (16-bit) indicates the horizontal and vertical coordinates of the display of the video output. For example, the target_window_position_horizontal field value and target_window_position_vertical field value indicates the position of the top left-most pixel of the outputted video.

The target_window_length_horizontal field (16-bit) and target_window_length_vertical field (16-bit) indicates the horizontal and vertical size of the window that displays the video output of content 2 in pixel unit. Thus, it indicates the horizontal and vertical size of the sub-screen to be displayed of content 2 when it is displayed within a full screen.

Further, when content 2 is displayed instead of NRT service as illustrated in FIG. 16 (a) through (d) the main and sub screen can be switched using the methods described above.

Figure 20:
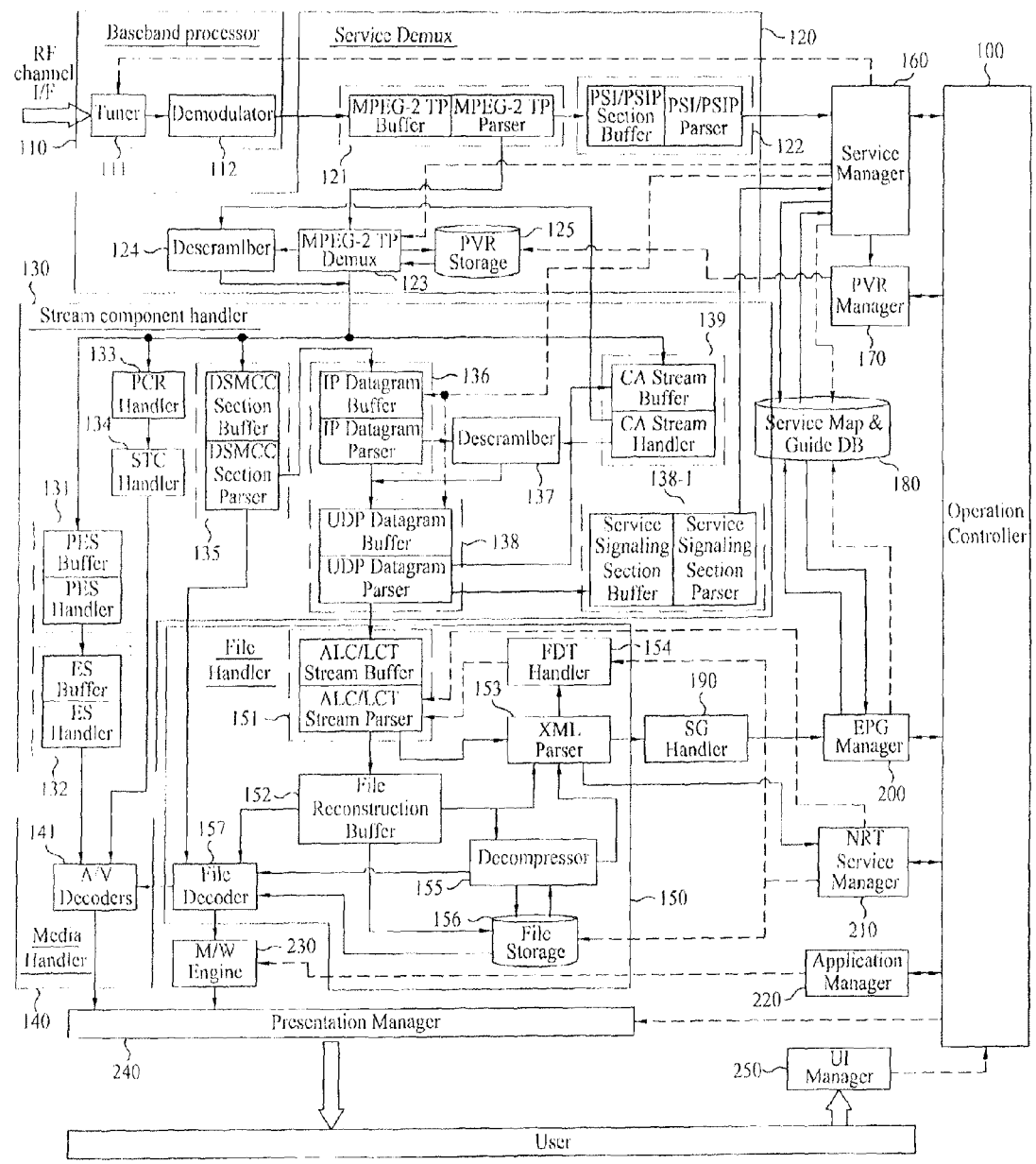
FIG. 20 is a block diagram illustrating a broadcast receiver that provides a Fixed NRT service according to an embodiment of the present invention.

FIG. 20 is a block diagram of a broadcast receiver for a Fixed NRT service according to an embodiment of the present invention.

The broadcast receiver in FIG. 20 includes an Operation Controller 100, a Baseband processor 110, a Service Demultiplexer 120, a Stream component handler 130, a Media Handler 140, a File Handler 150, a Service Manager 160, a PVR Manager 170, a first storage unit 180, an SG Handler 190, an EPG Manager 200, an NRT Service Manager 210, an Application Manager 220, a MiddleWare Engine 230, a Presentation Manager 240, and a UI Manager 250.

The Baseband processor 110 includes a Tuner 111 and a Demodulator 112. The Service Demultiplexer 120 includes an MPEG-2 TP Handler 121, a PSI/PSIP Handler 122, a Demultiplexer 123, a Descrambler 124 and a second storage unit 125.

The Stream component handler 130 includes a Packetized Elementary Stream (PES) decoder 131, an Elementary Stream (ES) decoder 132, a PCR Handler 133, an STC Handler 134, a DSM-CC Addressable Section Handler 135, an IP Datagram Handler 136, a Descrambler 137, a UDP Handler 138, a Service Signaling Section Handler 138-1, and a Conditional Access System (CAS) 139.

The Media Handler 140 includes an A/V Decoders 141. The File Handler 150 includes an ALC/LCT Stream Handler 151, a File Reconstruction Buffer 152, an XML Parser 153, an FDT Handler 154, a Decompressor 155, a third storage unit 156, and a File Decoder 157.

In the present invention, the first handler which receives and handles NST and NRT-IT includes at least the Service Manager 160 and the Service Demultiplexer 120. Also, the second handler which receives content item including at least one file in non-real time and executes to store in a storage media, includes at least the Baseband processor 110, the Service Demultiplexer 120, the Stream component handler 130, and the Media Handler 140. The storage media can be any one of the first storage unit 180, the second storage unit 125, or the third storage unit 156. The third handler which receives at least one file of the updated content by accessing the FLUTE session for transmitting the content includes at least the Service Manager 160, the NRT Service Manager 210, the Stream Component Handler 130, and the Media Handler 140.

The Tuner 111 for example in FIG. 20 detects signal transmitted over the terrestrial system with the control from the Service Manager 160 and tunes only the wanted channel, down converts to Intermediate Frequency (IF), and outputs to the Demodulator 112. The Tuner 111 may receive both real time stream and non-real time stream. In the present invention, non-real time stream is referred to as NRT stream.

The Demodulator 112 receives digital IF signal of pass bandwidth inputted from the Tuner 111 and performs automatic gain control, reconstructs carrier frequencies and timing to convert into baseband signal and equalizes the channel. For example, if the broadcast signal is a VSB modulated signal, a VSB demodulation process is executed for automatic gain control, and reconstructs carrier frequencies and timing. In the Demodulator 112, demodulated and equalized channel data is outputted to the MPEG-2 TP Handler 121 in a MPEG-2 Transport Stream (TS) packet format.

The MPEG-2 TP Handler 121 is configured of an MPEG-2 TP Buffer and an MPEG-2 TP Parser, temporarily stores the Demodulator 112 output and then analyzes TS Header, and outputs to the Demultiplexer 123 if the Demodulator 112 output is a real time A/V TS packet or NRT TS packet and outputs to the PSI/PSIP Handler 122 if the output is a TS packet for PSI/PSIP table.

The PSI/PSIP Handler 122 is configured of a PSI/PSIP Section Buffer and a PSI/PSIP Parser, and temporarily stores the outputted TS packet from the MPEG-2 TP Handler 121 to reconstruct the corresponding table from PSI/PSIP Section data included in the payload of TS packet with referencing table identifier and then parse it. At this time, it is possible to find out whether one table is configured by one section or plurality of sections by the table_id field, section_number field, and last_section_number field within the corresponding section. Further, completing the corresponding table is possible by gathering sections having identical table identifiers. For example, it is possible to complete a VCT by gathering the sections having table identifiers allocated to VCT. Also, each of the parsed table information is collected by the Service Manager 160 and then stored in the first storage unit 180. The VCT, PAT, PMT, DST and the like, are stored in the first storage unit 180 after going through the process. The Service Manager 160 stores the table information in the first storage unit 180 in the Service Map & Guide DB format.

The Demultiplexer 123 divides audio TS packet and video TS packet and then outputs to the PES Decoder 131 if the TS packet is real time A/V TS packet and outputs to the DSM-CC Handler 135 if it is an NRT TS packet. Also, the Demultiplexer 123 outputs to the PCR Handler 133 if the TS packet includes Program Clock Reference (PCR) and outputs to the CAS 139 if the TS packet includes Conditional Access (CA) information. The NRT TS packet is divided into TS packet including NRT service data and TS packet including NRT service signaling channel. A unique PID is allocated to identify the NRT service in the TS packet of the NRT service data and the PID of the TS packet including the NRT service signaling channel is extracted using DST and PMT.

The Demultiplexer 123 outputs to the Descrambler 124 if the payload of the inputted TS packet is scrambled and the Descrambler 124 receives descrambling information needed for descrambling (for example, control word used in scrambling) from the CAS 139 and performs descrambling of the TS packet.

The Demultiplexer 123 stores A/V packet of real time from any one of the record, timed-record, or time shift request in the second storage unit 125. The second storage unit 125 is a mass storage device, an example of it can be a HDD. The download (storage) and upload (playing) in the second storage unit 125 is controlled by the PVR Manager 170.

The Demultiplexer 123 outputs to the PES Decoder 131 by dividing audio TS packets and video TS packets from A/V TS packets uploaded from the second storage unit 125 according to a playback request.

The Demultiplexer 123, in order to perform such functions, is controlled by Service Manager 160 and/or PVR Manager 170.

Thus the Service Manager 160 receives DST by extracting the PID of the DST from the service location descriptor (or ES loop of PMT) of the VCT when the service_type field value indicates that NRT service is transmitted.

Further, NRT service is identified through the received DST, and extracts DST and PMT by using the PID of MPEG-2 TS including NRT service signaling channel. The extracted PID is outputted to the Demultiplexer 123. The Demultiplexer 123 outputs to the Addressable Section Handler 135 the MPEG-2 TS packets corresponding to PID outputted by the Service Manager 160.

The PCR is a standard time value used in syncing audio ES and video ES in the A/V Decoder 141. The PCR Handler 133 outputs to STC Handler 134 reconstructed PCR included in the payload of the inputted TS packet. The STC Handler 134 outputs to the A/V Decoder 141 reconstructed System Time Clock (STC) which is the standard clock from the system by the PCR.

The PES Decoder 131 is configured with a PES Buffer and a PES Handler, temporarily stores audio TS packet and video TS packet and removes TS header from each TS packet and reconstructs to audio PES and video PES. The reconstructed audio PES and video PES is outputted to the ES Decoder 132. The ES Decoder 132 is configured with an ES Buffer and an ES Handler, removes each PES header from audio PES and video PES and reconstructs audio ES and video ES which are pure data.

The A/V Decoder 141 uses each decoding algorithms to decode the audio ES and video ES and reconstructs to pre-compressed status and then outputs to the Presentation Manager 240. At this point, depending on the STC, the time sync is executed when audio ES and video ES are decoding. In one example, the audio decoding algorithm may apply at least one of AC-3 decoding algorithm, MPEG 2 audio decoding algorithm, HE AAC decoding algorithm, AAC SBR decoding algorithm, AAC+ decoding algorithm, HE AAC decoding algorithm, AAC SBR decoding algorithm, MPEG surround decoding algorithm, or BSAC decoding algorithm, and the video decoding algorithm may apply at least one of MPEG 2 video decoding algorithm, MPEG 4 video decoding algorithm, H.264 decoding algorithm, SVC decoding algorithm, and VC-1 decoding algorithm.

The CAS 139 is configured with a CA Stream Buffer and a CA Stream Handler, and the TS packet outputted from the MPEG-2 TP Handler 121 or the service protection data reconstructed and outputted from the UDP Datagram Handler 138 is temporarily stored and then reconstruct the needed information (control word used in scrambling) to descramble the stored TS packet or the service protected data. Thus, the CAS 139 acquires necessary information to descramble after extracting the Entitlement Management Message (EMM) and Entitlement Control Message (ECM) included in the payload of the TS packet, and then by analyzing the extracted EMM and ECM. The ECM may include the Control Word (CW) used in scrambling. The CW may be encrypted using the authentication key. The EMM may include authentication key of the corresponding data and the requirements information. The acquired information necessary for descrambling from the CAS 139 will be outputted to the Descramblers 124, 137.

The DSM-CC Section Handler 135 is configured with a DSM-CC Section Buffer and a DSM-CC Section Parser, temporarily stores the TS packet outputted from the Demultiplexer 123 and then reconstructs the addressable section included in the payload of the TS packet, and outputs to the IP Datagram Handler 136 after removing the header and the CRC checksum from the addressable section and then reconstructing the IP Datagram. The IP Datagram Handler 136 is configured with an IP Datagram Buffer and an IP Datagram Parser, and after buffering the IP datagram delivered from the DSM-CC Section Handler 135, extracts and analyzes the header of the buffered IP datagram and then outputs to the UDP Datagram Section Handler 138 after reconstructing the UDP datagram from the payload of the IP datagram.

At this point, if the IP datagram is scrambled, the scrambled UDP datagram is descrambled in the Descrambler 137 and then outputted to the UDP Datagram Handler 138. In one example, the Descrambler 137 gathers information needed for descrambling (for example, control words needed for scrambling) from the CAS 139 and descrambles the UDP datagram and then outputs to the UDP Datagram Handler 138.

The UDP Datagram Handler 138 is configured with UDP Datagram Buffer and UDP Datagram Parser, and after buffering the UDP datagram outputted from the IP Datagram Handler 136 or the Descrambler 137, extracts and analyzes the header of the buffered UDP datagram and reconstructs the data included in the payload of the UDP datagram. At this point, if the reconstructed data is service protection data then it is outputted to the CAS 139 and if it is NRT service signaling data, then it is outputted to the service signaling section handler 138-1, and if it is NRT service data then it is outputted to the ALC/LCT stream handler 151.

In an embodiment, the access information of the IP datagram transmitting NRT service signaling channel is a well-known destination IP address and well-known destination UDP port number.

Therefore, the IP Datagram Handler 136 and UDP Datagram Handler 138 has well-known destination IP multicast address and well-known destination UDP port number, and the IP multicast stream which transmits NRT service signaling channel, extracts the NRT service signaling data and outputs to the Service Signaling Section Handler 138-1.

The Service Signaling Section Handler 138-1 is configured with a Service Signaling Section Buffer and a Service Signaling Section Parser, and outputs to the Service Manager 160 the reconstructed and parsed NRT-IT received from the NRT Service Signaling Data such as the NST illustrated in FIG. 10 and FIG. 11, and the NRT-IT illustrated in FIG. 18 and FIG. 19. The access information of the FLUTE session transmitting content items/files configuring NRT service is acquired when the NST is parsed. The detail information of each content item is acquired when the NRT-IT is parsed.

The parsed information from NST and NRT-IT is collected by the Service Manager 160 and then stored in the first storage unit 180. The Service Manager 160 stores the extracted information from the NST and the NRT-IT in the first storage unit 180 in the Service Map & Guide format. In another embodiment, the NRT Service Manager 210 can perform the task that the Service Manager 160 performs. Thus, the parsed information from the NST and the NRT-IT may be collected by the NRT Service Manager 210 and then stored in the first storage unit 180.

According to an embodiment of the present invention, it is presumed that NRT_service_info_descriptor( ) is included in the NST and received.

In such a case, the Service Manager 160 or the NRT Service Manager 210 extracts NRT_service_info_descriptor from the NRT service loop of the NST as shown in FIG. 14 and acquire service information of the corresponding NRT service. If the process is performed for all NRT service included in the NST, service information for each NRT service unit, such as application type and additional requirement information can be acquired. Also, through the Presentation Manager 240, service type for each NRT service is displayed in the guide display. Further, using the other fields of NRT_service_info_descriptor, the detail information of the NRT service is indicated. When displaying the NRT service in a display, if the controlled_rendering_flag field value is '1,' then using the target_window_position_horizontal field, target_window_position_vertical field, target_window_length_horizontal field, and target_window_length_vertical field, the NRT service is displayed in a sub-screen. If the application type of the NRT service is not supported by the current broadcast receiver, an message is outputted to the user through On Screen Display (OSD).

Further, the corresponding NRT service can be omitted during output when the application type is Maintenance Data or Targeted Advertisement because download can be achieved without user interruption.

The NRT service manager 210 controls the handling of the corresponding NRT service by the service information acquired from the NRT_service_info_descriptor( ). For example, if the application_type field value is 3, means that it is a Targeted Advertisement, and that the user_control_flag field value is 1. In such a case the user can not randomly delete the corresponding NRT service. And if the expiration period of the expiration_type field value and the expiration_value field value is limited to 2 playbacks, the NRT service is automatically deleted if it was played 2 times.

The ALC/LCT Stream Handler 151 is configured with an ALC/LCT Stream Buffer and an ALC/LCT Stream Parser and after buffering the ALC/LCT structure data outputted from the UDP Datagram Handler 138, analyzes the header and the header extension of the ALC/LCT session buffered from the data. After analyzing the header and the header extension of the ALC/LCT session, if the data transmitted through ALC/LCT session is in XML structure then it is outputted to the XML Parser 153, and if the data is in file structure, it is temporarily stored in the File Reconstruction Buffer 152 and outputted to the File Decoder 157 or stored in the third storage unit 156. If the data transmitted through ALC/LCT session is data for NRT service, the ALC/LCT stream handler 151 gets controlled by the NRT service manager 210. If the data transmitted through ALC/LCT session is compressed, the Decompressor 155 decompresses and outputted to the XML Parser 153, the File Decoder 157, or the third storage unit 156.

The XML Parser 153 analyzes the XML data transmitted through ALC/LCT session and if the analyzed data is filed-based service then it is outputted to the FDT Handler 154 and if it is a data for service guide, then it is outputted to the SG Handler 190.

The FDT Handler 154 analyzes and processes the File Description Table of the FLUTE protocol through the ALC/LCT session. The FDT Handler 154 is controlled by the NRT Service Manager 210 if the received file is for the NRT service.

The SG Handler 190 gathers and analyzes the data for the service guide transmitted in XML structure, and then outputs to the EPG Manager 200.

The File Decoder 157 decodes the file outputted from the File Reconstruction Buffer 152, file outputted from the Decompressor 155, or filed uploaded from the third storage unit 156 using the pre-selected algorithm and outputs to the Middleware (M/W) Engine 230 or to the A/V Decoder 141. In an embodiment, the file is a file configuring NRT service.

The M/W Engine 230 interprets and executes the application, which is the data of the file structure such as the NRT service. Further, through the Presentation Manager 240, the application may be outputted to an output device such as a screen or a speaker. In an embodiment, the M/W Engine 230 is a JAVA platform based M/W Engine.

The EPG Manager 200, depending upon the input from the user, outputs the service guide data after converting into a display format received from the SG Handler 190 to the Presentation Manager 240. The Application Manager 220 manages the handling of the application data received in a file format.

The Service Manager 160 gathers and analyzes the NRT service signaling data transmitted through the PSI/PSIP table data or the NRT service signaling channel and creates a service map and the stores in the second storage unit 125. The Service Manager 160 controls the access information of the NRT service that the user wants and controls the Tuner 111, Demodulator 112, and the IP Datagram Handler 136.

The Operation Controller 100 according to the command from the user through the UI Manager 250, controls at least one of the Service Manager 160, the PVR Manager 170, the EPG Manager 200, the NRT Service Manager 210, the Application Manager 220, and the Presentation Manager 240, and executes the user's command.

The NRT Service Manager 210 manages the NRT Service transmitted in content/file format through the FLUTE session on the IP layer. At this point, the files configuring the NRT service is controlled by the NRT Service Manager 210 and then stored in either the second storage unit 125 or the third storage unit 156.

The UI Manager 250 delivers the user's input through the UI to the Operation Controller 100.

The Presentation Manager 240 provides the user through a speaker and/or a screen at least one of the audio and video data outputted from the A/V Decoder 141, file data (including NRT service data) outputted from the M/W Engine 230, or service guide data outputted from the EPG Manager 210.

So far, the explanation was service information applied to Fixed NRT service.

Mobile NRT Service

From now on, the service information applied to Mobile NRT service is explained.

In the present invention, the main service data, which is a term used with association of Mobile NRT service, is data able to receive from the fixed receiver system, including audio/video (A/V) data. Thus, the main service data may include High Definition (HD) or Standard Definition (SD) A/V data and may include various data for data broadcast. Moreover, Known data are data already known from the transmitter/receiver protocol.

In the present invention, M/H or MH stands for (Mobile/Handheld) which follows the first letter of each world and is the opposite concept of fixed service. The M/H service data includes at least one of Mobile service data, handheld service data and for the convenience of explanation in the present invention, M/H service data is referred to as Mobile service data. The mobile data service includes not only M/H service data but also can include services such as mobile or portable service and therefore the mobile service data is not limited to only M/H service data.

The mobile service data can include data such as program executable file, stock information, or A/V data. Especially, the mobile data service may be for mobile or portable device (or broadcast receiver) data service and thus the include A/V data with smaller resolution and data capacity than the main service data. For example, if the A/V code for existing main service is MPEG-2 codec, then MPEG-4 Advanced Video Coding (AVC) or Scalable Video Coding (SVC) can be used for the mobile service A/V codec because of its better compression efficiency. Further, through the mobile service data, any data may be transmitted. As an example, Transport Protocol Expert Group (TPEG) data may be transmitted for real-time traffic information for mobile service data.

Data services using the mobile data service may include weather information, traffic information, stock information, subscriber-participating quiz program, real-time poll, conversational education program, game service, summary of drama, casting information, background music information, location of the drama, results of sports games, profile of the athletes, product information and ordering service, information on program by its time, by its broadcaster, and topic, and it is not limited to the services described above.

Figure 21:
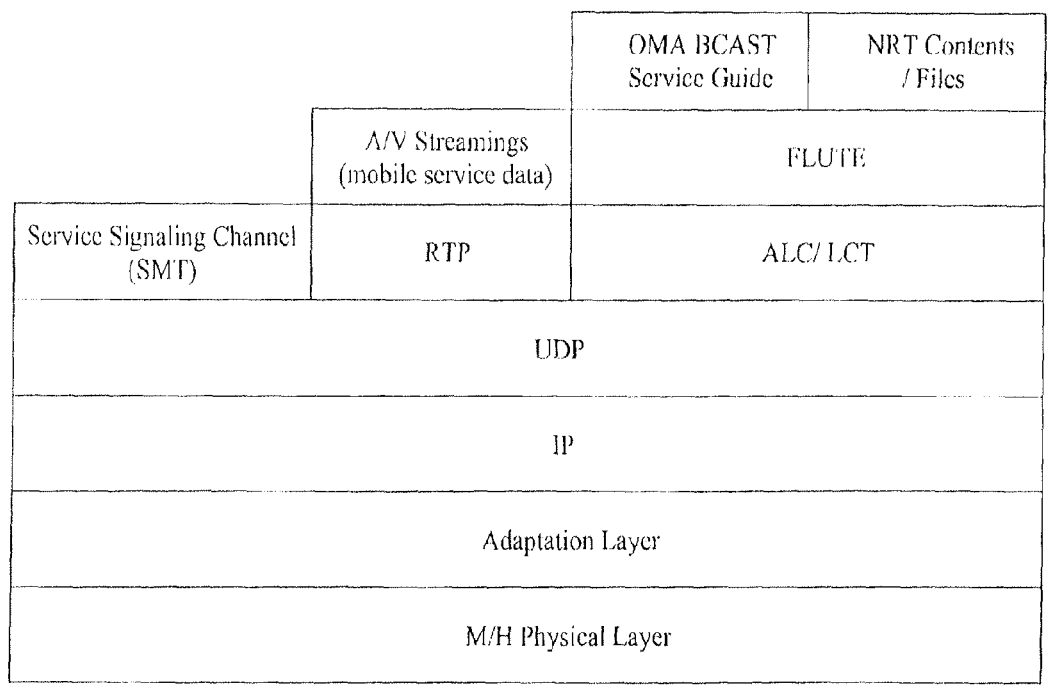
FIG. 21 illustrates an embodiment of a protocol stack for a mobile NRT service according to the present invention.

FIG. 21 is illustrates an embodiment of a protocol stack to provide Mobile NRT service. In FIG. 21, it shows how IP datagram of mobile service data and IP datagram of signaling information is transmitted without using MPEG-2 TS format by including Adaptation Layer in between IP layer and physical layer.

According to FIG. 21, the broadcaster packetized NRT content item/files through the File Transfer Protocol and again packetized according to the Asynchronous Layered Coding/Layered Coding Transport (ALC/LCT). The packetized ALC/LCT data is packetized again by UDP method and the packetized ALC/LCT/UDP data is packetized again by IP method and becomes ALC/LCT/UDP/IP data. In the present invention, packetized ALC/LCT/UDP/IP data is referred to as IP datagram for the convenience of explanation. At this point, OMA BCAST service guide information can also configure the IP datagram by going through the same process as the NRT content/file.

Also the NRT service signaling information is transmitted through NRT service signaling channel to receive the NRT content item/files, the NRT service signaling channel is packetized according to the User Datagram Protocol (UDP) method, and the packetized UDP data is again packetized according to the IP method and becomes UDP/IP data. For the convenience of explanation, UDP/IP data in the present invention is also referred to as IP datagram. The NRT service signaling channel has well-known IP destination address and well-known destination UDP port number and in an embodiment, it is multicasted by encapsulated in the IP datagram.

Further, A/V streaming for mobile service is configured as one of the IP datagram through sequentially adding RTP header, UDP header, and IP header.

In the adaptation layer, IP datagram of the NRT service, NRT service signaling channel, and the mobile service data is gathered to generate RS frame. The IP datagram of the OMA BCAST service guide may be included in the RS frame.

In the RS frame, the column length (number of rows) is set to 187 bytes and the length of the row (number of columns) is N byte and the N can be changed depending on signaling information such as the transmission parameter (or TPC data).

An example of the pre-determined transmission method in the mobile physical layer of the RS frame is modulated in VSB transmission method and transmitted to receiving system.

Here, the NRT service signaling data transmitted through NRT service signaling channel for mobile NRT service includes Service Map Table (SMT). The SMT provides access information of component (or content item) included in services, such as RT service or NRT service included in mobile broadcast.

The SMT is a signaling information table corresponding to NST of the Fixed NRT service. If the service included in the mobile broadcast is an NRT service, then the signaling information including the access information of the FLUTE session transmitting the content item/files configuring NRT from the SMT can be extracted. And detailed information of the content item configuring the NRT service from the OMA BCAST service guide (SG) can be extracted.

Meanwhile, the following describes the data group structure and RS frame structure used in the mobile broadcast technology data structure.

Figure 22:
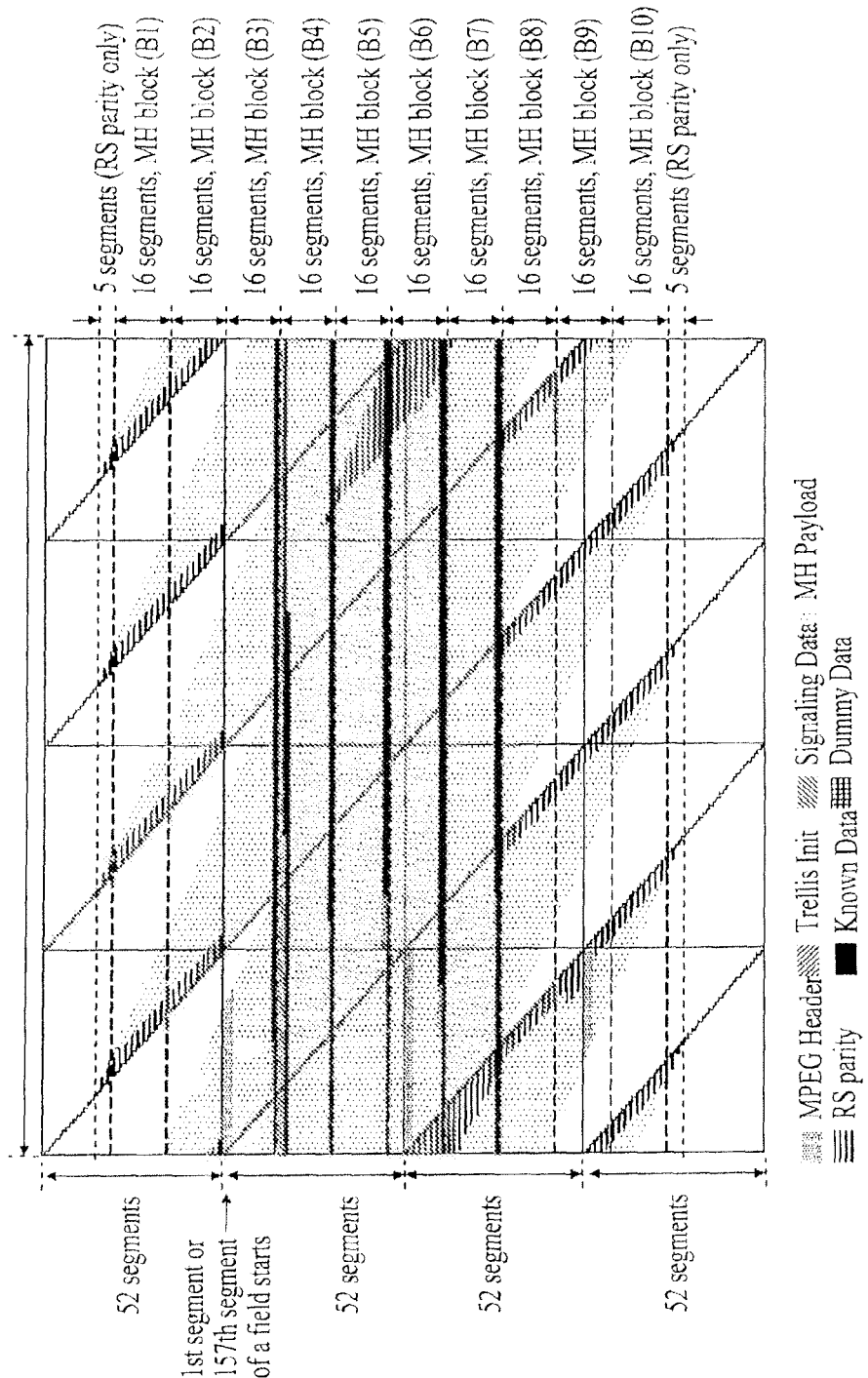
FIG. 22 illustrates an embodiment of data group structure according to the present invention.

FIG. 22 illustrates a structure of the data group according to an embodiment of the present invention.

The data configuration according to FIG. 22 are separated into 10 M/H block, B1~B10 in an example. In an embodiment, each M/H block has 16 segments in length. According to an embodiment shown in FIG. 22, first 5 segment of M/H block B1 and last 5 segment of M/H block B10 are allocated with RS parity data and no allocation for data group A through D region.

Thus, assuming that one data group is separated into A, B, C, and D region, depending on the nature of each M/H block within the data group each M/H block can be included in region A through region D. Here, in an embodiment, depending on the interference of the main service data, each M/H block is included in group A through group D.

The reason the data group is separated into different regions is to differentiate the use of each regions. Thus, regions with no interference or less interference by the service data, probably shows stronger receiving capability than regions that have more interference. Also, when the transmitting/receiving side applies system that transmits data group inserting the known data, it is possible to insert known data of the fixed length periodically to the non-interfering region (region with no main data mixed) when inserting long known data continuously to the mobile service data periodically. However, in the region where there is interference by the main service data, it is hard to insert data periodically due to interference by the main data and it is also hard to insert long known data continuously.

The M/H block B4 through M/H block B7 within the data group shown in FIG. 22 are regions without interference of the main service data and long known data rows are inserted in the front and the back of each M/H block. According to the present invention A region (=B4+B5+B6+B7) includes the M/H block B4 through M/H block B7. In case of region A where each M/H block has known data in the front and the back, the receiving system is able to acquire channel information from the known data and perform equalization so region A has the strongest equalization capability among regions A through D.

The M/H block B3 and M/H block B8 within data group of FIG. 22 are regions where the interference of the main service data are less and long known data row is inserted in one side of both M/H blocks. Thus, the known long data row is only inserted at the back of the corresponding M/H block of M/H block B3 due to less interference of main service data and known long data row is only inserted in the front of the corresponding M/H block of M/H block B8. In the present invention, the M/H block B3 and M/H block B8 is included in region B (=B3+B8). In case of region B where only one side of each M/H block having known data row, the receiving system may acquire channel information from the known data and perform equalization, it can have a stronger equalization capability than region C/D.

The M/H block B2 and M/H block B9 within the data group as illustrated in FIG. 22 has more main service data interference than region B and cannot insert long known data row in both front and back of both M/H blocks. In the present invention, the M/H block B2 and M/H block B9 is included in region C (=B2+B9).

The M/H block B1 and M/H block B10 within data group shown in FIG. 22 has more main service interference than region C and both M/H blocks cannot have long known data row inserted in either sides. In the present invention, the M/H block B1 and M/H block B10 is included in region D (=B1+B10). The region C/D is very far from the known data row so when there is a fast channel change, the receiving capability may not be as good.

Further, the data group includes signaling information region where the signaling data (or signaling information) is allocated.

In the present invention, parts of first segment through second segment of M/H block B4 within the data group can be used as signaling information region.

According to an embodiment of the present invention, 276 (=207+69) bytes of M/H block B4 of each data group is used as the signaling information region. Thus, the signaling information region is made up with first segment 207 bytes of the M/H block B4 and first 69 bytes of the second segment. The first segment of the M/H block B4 corresponds to 17th or 173rd segment of the VSB field.

The signaling data transmitted through signaling information region can be distinguished in two types of signaling channel data. One is Transmission Parameter Channel (TPC) data and the other is Fast Information Channel (FIC) data.

The TPC data includes parameters used in the Physical layer module and it is transmitted without interleaving therefore it is possible to access by slots in the receiving system.

The FIC data provides fast service acquisition at the receiver and includes cross layer information between the physical layer and upper layer. The FIC data is interleaved and transmitted in sub frame unit.

For example, when the data group as illustrated in FIG. 22 includes 6 known data rows, the signaling information region is located in between the first known data row and the second known data row. The first known data row is inserted at the last 2 segment of the M/H block B3 in the data group and the second known data row is inserted between the second and the third segment of the M/H block B3 within the data group. And the third through the sixth known data row is inserted in each of the last 2 segment of M/H block B4, B5, B6, B7. The first and the third through the sixth known data row are separated by 16 segments.

Figure 23:
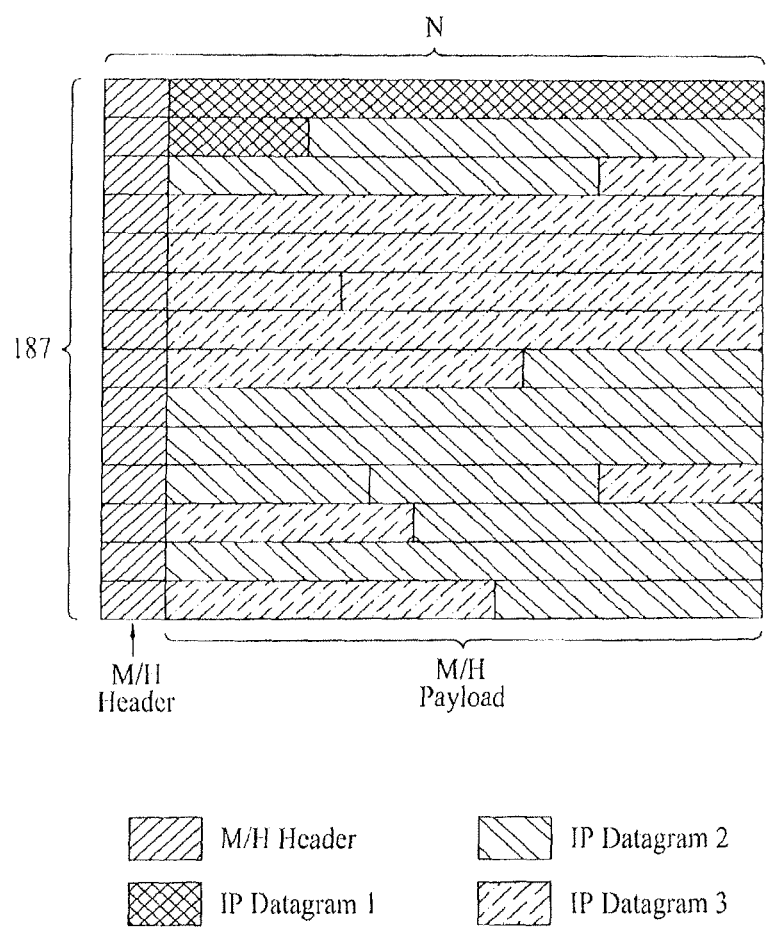
FIG. 23 illustrates an embodiment of a RS frame structure including a mobile NRT service according to the present invention.

FIG. 23 illustrates a structure of RS frame including Mobile NRT Service according to an embodiment of the present invention.

The RS frame is converted in time-slicing mode and received in each M/H frame. One RS frame includes each mobile service data or IP streams of signaling data and all RS frame includes IP datagram of Service Map Table (SMT) section. The SMT section data can be in IP stream format or in different format. The RS frame data may include IP datagram such as NRT content/file and OMA BCAST service guide data for NRT service.

In an embodiment, the IP datagram having a well-known IP destination address and well-known UDP port number for transmitting the SMT or the NRT service signaling channel is included in the corresponding RS frame and received.

The RS frame data is transmitted in a plurality of data groups allocated in the corresponding region.

According to an embodiment of the present invention, RS frame is formed in at least one of M/H Transport Packet (TP). These M/H TP are made of M/H header and M/H payload.

The M/H payload may include at least one IP datagram of mobile service data and NRT service data. The M/H payload may include datagram of SMT. The M/H frame may include IP datagram of OMA BCAST service guide data.

The RS frame in FIG. 22 illustrates allocation of IP Datagram 1 for SMT, IP Datagrams (IP Datagram 2, IP Datagram 3) for two types of NRT service.

Figure 24:
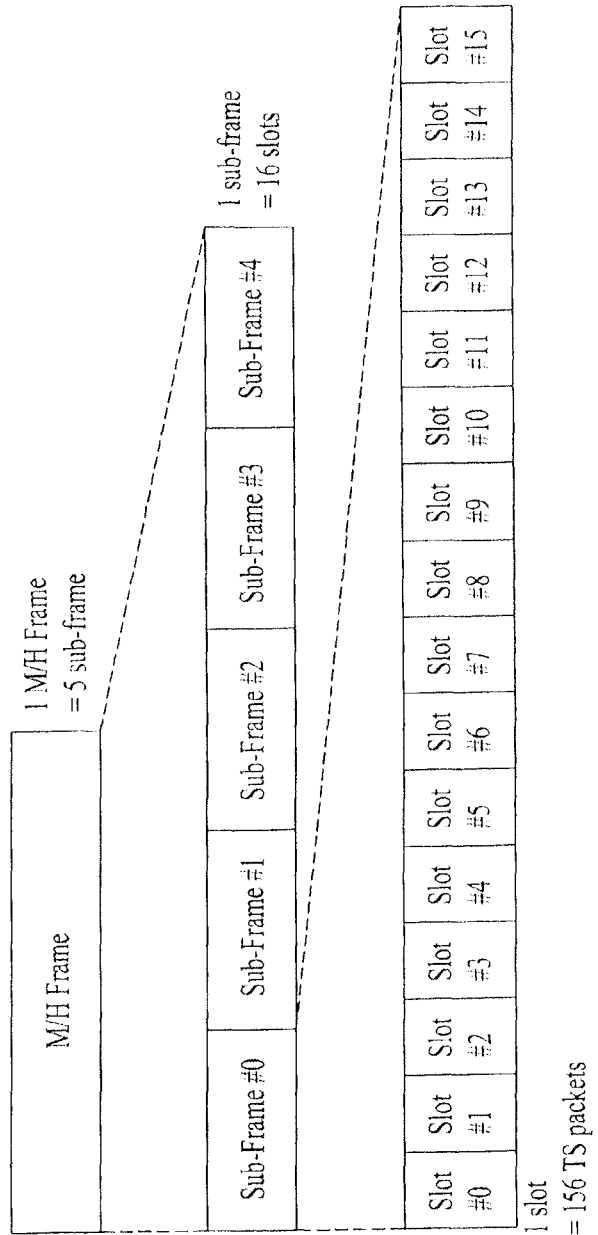
FIG. 24 illustrates a Mobile Handheld (M/H) frame structure for receiving and transmitting mobile service data according to the present invention.

FIG. 24 illustrates a M/H frame structure for transmitting/receiving mobile service data according to an embodiment.

In FIG. 24 one M/H frame is made up with 5 sub-frames and one sub-frame is made up with 16 slots. In this case, one M/H frame has 5 sub-frames and 80 slots.

Further, one slot is made up with 156 data (transport stream) packet at the packet level and 156 data segments in the symbol level. In other words, it has half the size of the VSB field. Thus, one data packet having 207 bytes has the same data quantity as one data segment, therefore before the data being interleaved; the data packet can be used as a data segment. Here, two VSB fields are gathered to make up one VSB frame.

One VSB frame includes two VSB field (odd and even field). And each VSB field includes one field sync segment and 312 data segments.

The slot is the basic time unit for multiplexing mobile service data and main service data. One slot can include mobile service data or include only the main service data.

If the first 118 data packets corresponds to one data group within the slot, the remaining 38 packets becomes main service data packet. In another example, if there are no data groups in one slot, the corresponding slot includes 156 main service data packets.

Meanwhile, mobile service data in one RS frame can be allocated in regions A/B/C/D of the data group and can be allocated in at least one of regions A/B/C/D. In an embodiment of the present invention, the mobile service data in one RS frame is allocated in all of regions A/B/C/D or allocated in one of regions A/B and regions C/D. In case where the mobile service data is allocated in one of regions A/B and regions C/D, the RS frame allocated in regions A/B is different from the RS frame allocated in regions C/D. According to an embodiment of the present invention the RS frame allocated in regions A/B of the data group is referred to as Primary RS frame and RS frame allocated in regions C/D of the data group is referred to as Secondary RS frame. Moreover, both the primary RS frame and secondary RS frame is included in one parade. Thus, if the mobile service data in one RS frame is allocated in all regions A/B/C/D of the data group, one parade transmits one RS frame. In the other hand, if the mobile service data in one RS frame is allocated in regions A/B of the data group and the mobile service data in the other RS frame is allocated in regions C/D of the data group, one parade transmits up to two RS frames.

Thus, RS frame mode instructs whether one parade transmits one RS frame or two RS frames. This RS frame mode is transmitted in TPC data.

Table 2 is an example of the RS frame mode.

TABLE 2

| RS frame mode | Description |
| --- | --- |
| 00 | There is only one primary RS frame for all Group Regions |

TABLE 2-continued

| RS frame mode | Description |
| --- | --- |
| 01 | There are two separate RS frames<br>Primary RS frame for Group Region A and B<br>Secondary RS frame for Group Region C and D |
| 10 | Reserved |
| 11 | Reserved |

In Table 2, to indicate the RS frame mode, 2 bit is allocated. As shown in Table 2, if the RS frame mode value is 00 then one parade transmits one RS frame and if the RS frame mode value is 01, one parade transmits two RS frames (primary RS frame and secondary RS frame). Thus, if the RS frame mode value is 01, the data of the Primary RS frame for region A/B is transmitted by being allocated in region A/B of the data group, and data of the Secondary RS frame for region C/D is transmitted by being allocated in region C/D of the data group.

In an embodiment, as same as the allocation with the data group, the parades are allocated far away from each other as possible. This is to effectively deal with bust error generating within one sub-frame.

The allocation method of the parades can be differently applied to each M/H frame and also can be applied equally to all M/H frame. Further, the allocation method can be applied equally to all the sub-frame in one M/H frame or can be applied differently for each sub-frame. According to an embodiment of the present invention, the method can be applied differently for each M/H frame and the method can be equally applied to all sub-frames in one M/H frame. Thus, the structure of the M/H frame can be different by each M/H frame unit and this allows the ensemble data ratio to be flexibly adjusted.

Thus, in an embodiment the concept of Ensemble is introduced and defines the set of the service. One M/H ensemble has the same QoS and is coded in same FEC code. Also, one ensemble has same ensemble id and corresponds to continuous RS frame.

Figure 25:
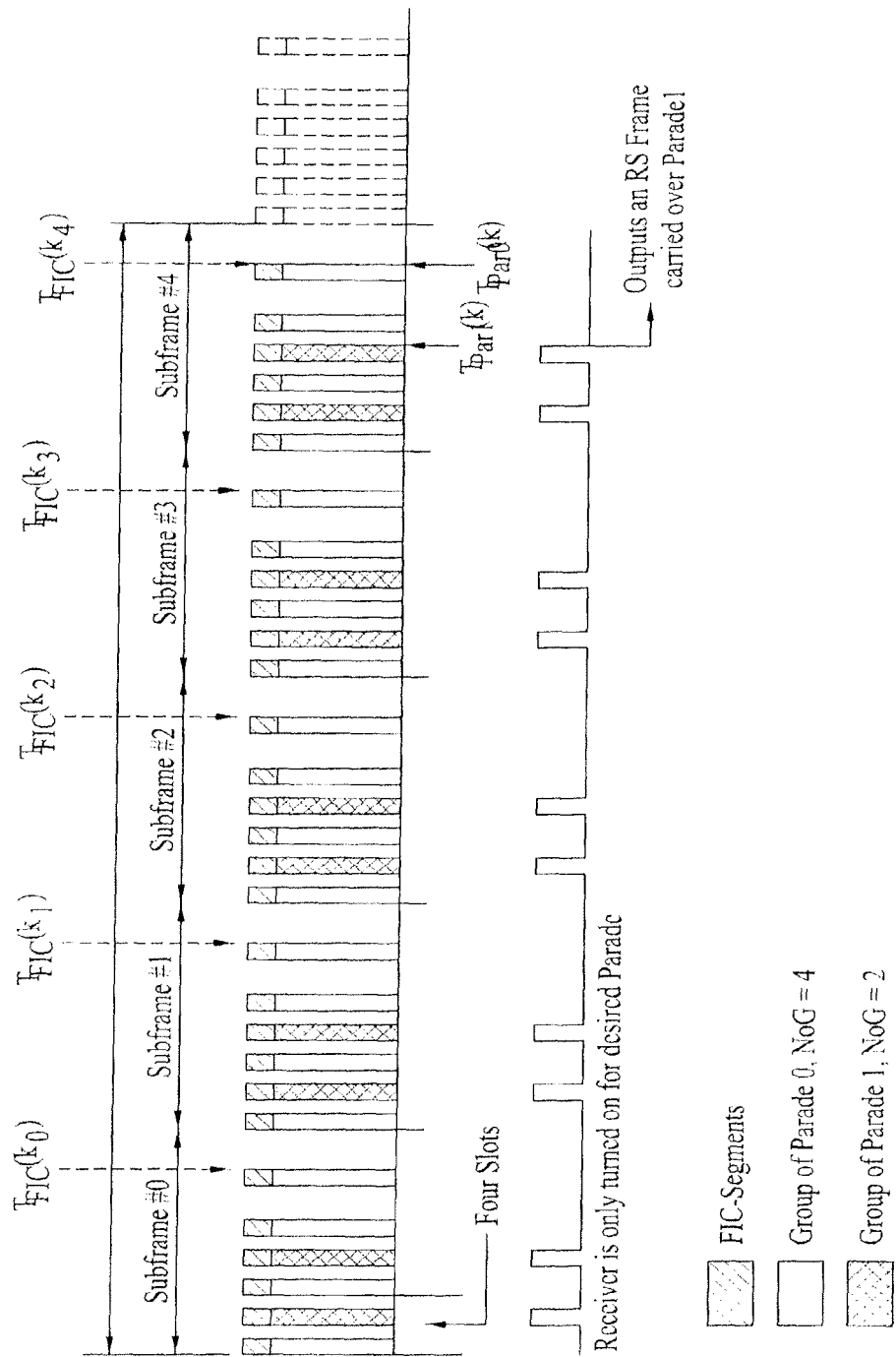
FIG. 25 illustrates a data transmitting structure of physical layer according to the present invention.

FIG. 25 illustrates a structure of data transmission in the physical layer where FIC data is included in each data group according to an embodiment of the present invention.

As explained, M/H frame of about 0.968 seconds is partitioned into 5 sub-frames and each sub-frame exists with many data groups corresponding to ensemble and each ensemble includes data groups with one ensemble interleaved in M/H frame unit to make up one RS frame. In FIG. 24 there are 2 ensembles (NoG=4 and NoG=3). Further fixed part (e.g. 37 bytes/data group) of each data group is used to deliver FIC data applied apart from the RS frame data channel. FIC region allocated to each data group includes one FIC segment and the FIC segments are interleaved in sub-frame unit. For example, in an embodiment, RS encoding and serial concatenated convolution code (SCCC) encoding is applied to the RS frame data and RS encoding and parallel concatenated convolution code (PCCC) encoding is applied to the FIC data. Meanwhile, RS encoding and PCCC encoding is applied to TPC data as well. Here, the (187+P, 187)-RS encoding is applied to the RS frame data and (51, 37)-RS encoding is applied to the FIC data. In an embodiment, (18, 10)-RS encoding is applied to the TPC data. P indicates the number of parity bytes.

FIG. 26 illustrates a bit stream syntax of SMT section providing signaling information of NRT service data transmitted in with the RS frame of FIG. 23 according to an embodiment.

Here, the corresponding syntax is described in MPEG-2 Private section format for ease of explanation, but the data format can be in any type of format.

The SMT describes the mobile service signaling information (or NRT service signaling information) and IP access information within the transmitted Ensemble. The SMT also provides broadcast stream information of the corresponding service by using the Transport Stream ID which is the identifier of Broadcast stream of each service. Further, according to an embodiment of the present invention, SMT includes Description information of each mobile service (or NRT service) in one ensemble and also can include addition information about the Descriptor region.

As illustrated in FIG. 26, SMT section can be transmitted in IP stream format within the RS frame. Here, the RS frame decoders of the receiver, which will be explained, decodes the inputted RS frame and outputs the decoded RS frame to the corresponding RS frame handler. Further, each RS frame handler is distinguished in row unit of the inputted RS frame and makes up the M/H TP and outputted to M/H TP handler.

The examples of the fields that can be transmitted through SMT are as follows.

A table_id field is an 8-bit unsigned integer number that indicates the type of table section being defined in Service Map Table (SMT).

A section_syntax_indicator is a 1-bit field that shall be set to '0' to always indicate that this table is derived from the "short" form of the MPEG-2 private section table.

A private_indicator field is a 1-bit field that shall be set to '1,' to indicate whether the SMT follows the private section.

A section_length field is a 12-bit field. It specifies the number of remaining bytes of the table section immediately following this field. The value in this field shall not exceed 4093 (0xFFD).

A table_id_extension field is a 16-bit field and is table-dependent. It shall be considered to be logically part of the table_id field providing the scope for the remaining fields. Here, the table_id_extension field includes the SMT_protocol_version.

A SMT_protocol_version field is an 8-bit unsigned integer field whose function is to allow, in the future, that current SMT to carry parameters that may be structured differently than those defined in the current protocol. At present, the value for the SMT_protocol_version shall be zero. Non-zero values of SMT_protocol_version may be used by a future version of this standard to indicate structurally different tables.

An ensemble_id field is an 8-bit unsigned integer field in the range 0x00 to 0x3F that shall be the Ensemble ID associated with this Ensemble. The value of this field shall be derived from the parade_id carried from the baseband processor of physical layer subsystem, by using the parade_id of the associated Parade for the least significant 7 bits, and using '0' for the most significant bit when the Ensemble is carried over the Primary RS frames, and using '1' for the most significant bit when the Ensemble is carried over the Secondary RS frames.

A version_number field (5-bit) indicates the SMT version number.

A current_next_indicator field (1-bit) when set to '1' shall indicate that the Service Map Table sent is currently applicable. When the bit is set to '0,' it shall indicate that the table sent is not yet applicable and will be the next table to become valid. This standard imposes no requirement that "next" tables (those with current_next_indicator set to '0') must be sent. An update to the currently applicable table shall be signaled by incrementing the version_number field.

A section_number field (8-bit) shall give the section number of this NRT Service Signaling Table section. The section_number of the first section in an NRT Service Signaling Table shall be 0x00. The section_number shall be incremented by 1 with each additional section in the NRT Service Signaling Table.

A last_section_number field (8-bit) shall give the number of the last section (i.e., the section with the highest section_number) of the Service Signaling table of which this section is a part.

A num_services field (8-bit) specifies the number of services in this SMT section. The Ensemble including the SMT can have at least one mobile service included and received, can have at least one NRT service included and received, or can have both mobile service and NRT service included and received. If the SMT includes ensemble only including NRT services, the number of NRT services included in the SMT can be instructed.

The signaling information of a plurality of services is provided for executing the 'for' loop (or also referred to as service loop) for the number of services corresponding to the num_services field value. Thus, the signaling information of the corresponding services included in the SMT section is indicated. Here, the service can be a mobile service or an NRT service. The information of the field regarding each service is explained as follows.

A service_id field is a 16-bit unsigned integer number field that shall uniquely identify this service within the scope of this SMT section. The service_id of a service shall not change throughout the life of the service. To avoid confusion, it is recommended that if a service is terminated, then the service_id for the service should not be used for another service until after a suitable interval of time that has elapsed. Here, if the service is an NRT service, then the service_id identifies the NRT service.

A multi_ensemble_service field is a 2-bit enumerated field that shall identify whether the Service is carried across more than one Ensemble. Also, this field shall identify whether or not the Service can be rendered only with the portion of Service carried through this Ensemble.

A service_status field (2-bit) identifies the status of the corresponding service. Here, MSB instructs whether the service is active ('1') or inactive ('0') and LSB instructs whether the service is hidden ('1') or not ('0'). If the service is an NRT service, the MSB of the service_status field instructs whether the NRT service is active ('1') or inactive ('0') and LSB instructs whether the NRT service is hidden ('1') or not ('0').

A SP_indicator field is a 1-bit field that indicates when se to 1, that the service protection is applied to at least one of the components needed to provide a meaningful presentation of this Service.

A short_service_name_length field (3-bit) indicates the length of the short service name described in short_service_name field in bytes.

A short_service_name field indicates the short name of the corresponding service. In the short name of the Service, each character shall be encoded per UTF-8 [20]. When there are an odd number of bytes in the short name, the second byte of the last of the byte pair per the pair count indicated by the short_service_name_length field shall contain 0x00. For example, if the service is a mobile service it indicates the short name of the mobile service, and if the service is an NRT service, it indicates the short name of the NRT service.

A service_category field (6-bit) as illustrated in Table 3, identifies the type of the service. If the field value indicates "Informative only" the value of the field is set to informative description of the corresponding category. And the receiver is requested to examine the component_level_descriptors( ) field of the SMT to identify the actual service of the category. For services including video and/or audio components, it will have NTP time base component.

TABLE 3

| service_category | Meaning |
| --- | --- |
| 0x00 | The service category is not specified by the service_category field. Look in the component_level_descriptors( ) to identify the category of service. |
| 0x01 | Basic TV (Informative only)—Look in the component_level_descriptors( ) to identify the specific category of service. |
| 0x02 | Basic Radio (Informative only)—Look in the component_level_descriptors( ) to identify the specific category of service. |
| 0x03 | RI service—Rights Issuer service as defined in Part #6 [34] of this standard. |
| 0x04-0x07 | Not specified by the current version of this standard. |
| 0x08 | Service Guide—Service Guide (Announcement) as defined in Part #4 [x] of this standard. |
| 0x09-0x0C | Not specified by the current version of this standard. |
| 0x0E | NRT Service |
| 0x0F-0XFF | [Reserved for future ATSC use] |

Especially, with regard to the present invention, as an example of the service_category field value, if the value indicates '0x0E' then it means that the corresponding service is an NRT service. Here, the signaling information describing the service in the SMT section corresponds to an NRT service signaling information.

A num_components field (5-bit) specifies the number of IP stream components in this service.

IP_version_flag field (1-bit) is an indicator, which when set to '0' shall indicate that source_IP_address, service_destination_IP_address, and component_destination_IP_address fields are IPv4 addresses. The value of '1' for this field is reserved for possible future indication that source_IP_address, service_destination_IP_address, and component_destination_IP_address fields are for IPv6. Use of IPv6 addressing is not currently defined.

A source_IP_address_flag field (1-bit) is a Boolean flag that shall indicate, when set, that a source IP address value for this Service is present to indicate a source specific multicast.

A service_destination_IP_address_flag field (1-bit) is a Boolean flag that indicates, when set to '1,' that a service_destination_IP_address value is present, to serve as the default IP address for the components of this Service.

A source_IP_address field (32 or 128 bit) shall be present if the source_IP_address_flag is set to '1' and shall not be present if the source_IP_address_flag is set to '0.' If present, this field shall contain the source IP address of all the IP datagrams carrying the components of this Service. The conditional use of the 128 bit-long address version of this field is to facilitate possible use of IPv6 in the future, although use of IPv6 is not currently defined.

If the service is an NRT service, the Source_IP_address field becomes the source IP address of same server transmitting all channels of FLUTE session.

A service_destination_IP_address field (32 or 128 bit) shall be present if the service_destination_IP_address_flag is set to '1' and shall not be present if the service_destination_IP_address_flag is set to '0.' If this service_destination_IP_address is not present, then the component_destination_IP_address field shall be present for each component in the num_components loop. The conditional use of the 128 bit-long address version of this field is to facilitate possible use of IPv6 in the future, although use of IPv6 is not currently defined. If the service is an NRT service, the service_destination_IP_address field is signaled if destination IP address of session level of FLUTE session is present.

Meanwhile, according to an embodiment, SMT provides information about plural components using the 'for' loop.

The access information of the plural components is provided by executing 'for' loop (or referred to as component loop) for the number of components corresponding to the num_components field value.

An essential_component_indicator field (1-bit) when set to '1,' shall indicate that this component is an essential component for the service. Otherwise, this field indicates that this component is an optional component.

A component_destination_IP_address_flag field (1-bit) is a Boolean flag that shall indicate, when set to '1,' that the component_destination_IP_address is present for this component.

A port_num_count field (6-bit) shall indicate the number of destination UDP ports associated with this UDP/IP stream component. The values of the destination UDP port numbers shall start from the component_destination_UDP_port_num field and shall be incremented by one, except in the case of RTP streams, when the destination UDP port numbers shall start from the component_destination_UDP_port_num field and shall be incremented by two, to allow for the RTCP streams associated with the RTP streams.

A component_destination_UDP_port_num field (16-bit) that represents the destination UDP port number for this UDP/IP stream component. For RTP streams, the value of component_destination_UDP_port_num shall be even, and the next higher value shall represent the destination UDP port number of the associated RTCP stream.

A component_destination_IP_address field (32 or 128 bit) shall be present if the component_destination_IP_address_flag is set to '1' and shall not be present if the component_destination_IP_address_flag is set to '0.' When this field is present, the destination address of the IP datagrams carrying this component of the M/H Service shall match the address in this field. When this field is not present, the destination address of the IP datagrams carrying this component shall match the address in the service_destination_IP_address field. The conditional use of the 128 bit-long address version of this field is to facilitate possible use of IPv6 in the future, although use of IPv6 is not currently defined.

A num_component_level_descriptors field (4-bit) indicates the number of descriptors providing additional information of the component level.

The component_level_descriptor( ) is included in the component loop for number corresponding to the num_component_level_descriptors field value and provides additional information about the component.

A num_service_level_descriptors field (4-bit) indicates the number of descriptors providing the additional information of the service level.

The service_level_descriptor( ) is included in the service loop for the number corresponding to the num_service_level_descriptors field value and provides additional information about the service. If the service is a mobile service, additional information about the mobile service is provided and if the service is an NRT service, additional information about the NRT service is provided.

A num_ensemble_level_descriptors field (4-bit) indicates the number of descriptors providing the additional information of the ensemble level.

The ensemble_level_descriptor( ) is included in the ensemble loop for the number corresponding to the num_ensemble_level_descriptors field value and provides additional information about the ensemble.

Meanwhile, the SMT illustrated in FIG. 26 may provide component_level_descriptors( ) which corresponds to the same component_descriptors( ) provided in FIG. 12.

The component_descriptor( ) is used as one of component_level_descriptors( ) of SMT and describes additional signaling information of the corresponding component.

Therefore, it is possible to use the component_descriptor( ) in FIG. 12 to provide the signaling information needed to receive the FLUTE session in mobile NRT service.

For example, if the component_type field value of component_descriptor( ) is 38 as illustrated in FIG. 12, component_data(component_type) field provides data for FLUTE file delivery as illustrated in FIG. 13. The explanation of each field in FIG. 12 and FIG. 13 have been explained and therefore is omitted.

Meanwhile, when receiving Mobile NRT service in a mobile broadcasting environment as mentioned in the present invention, whether NRT service is received through corresponding RS frame or not is checked by using service_category field of the signaling table (for example, SMT).

For example, in Mobile NRT service, as described in Table 3, if the service category field value of the SMT service is 0x0E (meaning NRT service), then it is deemed that NRT service is received through the RS frame.

However, it is hard to handle various NRT use case by just using the service category field.

Therefore, the present invention is able to control the operation of NRT service (or content) according to the service information in the broadcast receiver by transmitting the signaled service information including the service type (or application type) and the detailed information of the service type information of mobile NRT service. In other words, in the present invention, using the service information including the service type and the detailed information of the service type, it is possible to effectively handle the NRT service or the contents included in the NRT service. Further, using the service information to check whether the NRT service can be handled before receiving NRT service and storing in a storage medium is also possible.

For example, the broadcast receiver may determine the handling method of the NRT service by using the service information. Also, using the service information, it is possible to determine how to provide the user with the NRT service and it is possible to determine the operation of the associated application module.

The service information can be included in the SMT as a field type or a descriptor type.

In an embodiment, if the service information is included as a descriptor format in the SMT, the service information is included as one of the service level descriptor of the SMT. In such a case, the service information is applied separately in NRT service.

For example, if one NRT service includes content 1 and content 2, the service information is applied to content 1 and content 2 included in the NRT service at the same time.

In an embodiment, for mobile NRT service, the NRT_service_info_descriptor( ) shown in FIG. 14 is applied.

In an embodiment, the meanings in FIG. 15 applies to the application_type field value in NRT_service_info_descriptor( ).

Therefore, explanation of each field of NRT_service_info_descriptor( ) included in SMT for mobile NRT service is explained in FIG. 14 and FIG. 15, so it is omitted in this part.

SMT is extracted by using the table identifier from the NRT service signaling channel, NRT_service_info_descriptor, as illustrated in FIG. 14, is extracted from the SMT service loop, and acquire service information of the NRT service. The extracted service information is displayed in the NRT service guide display. For example, if the NRT service application_ type field value is 0, then the NRT service is an ordinary audio/video clip. Also, detailed information of the NRT service is indicated by using other fields of NRT_service_info_ descriptor( ) of the NRT service. For example, capacity, authority information, codec information, encapsulation format information, expiration period, and the like of the NRT service may be indicated. When the NRT service is displayed in the display, if the controlled_rendering_flag field value is '1,' the NRT service is displayed in the sub-screen based on target_window_position_horizontal field, target_window_ position_vertical field, target_window_length_horizontal field, and target_window_length_vertical field.

If the NRT service application_type is not supported by the current broadcast receiver, message of On Screen Display (OSD) is displayed so that the user knows about it.

Further, if the application type is Maintenance Data or Targeted Advertisement, the download is performed without user intervention so it is omitted when displaying the NRT service guide.

As described, the NRT_service_info_descriptor( ) in FIG. 14 is included in the service level descriptor of NST or in the content level descriptor of NRT-IT for Fixed NRT service. Also, it is included in the service level descriptor of SMT for Mobile NRT service.

Figure 27:
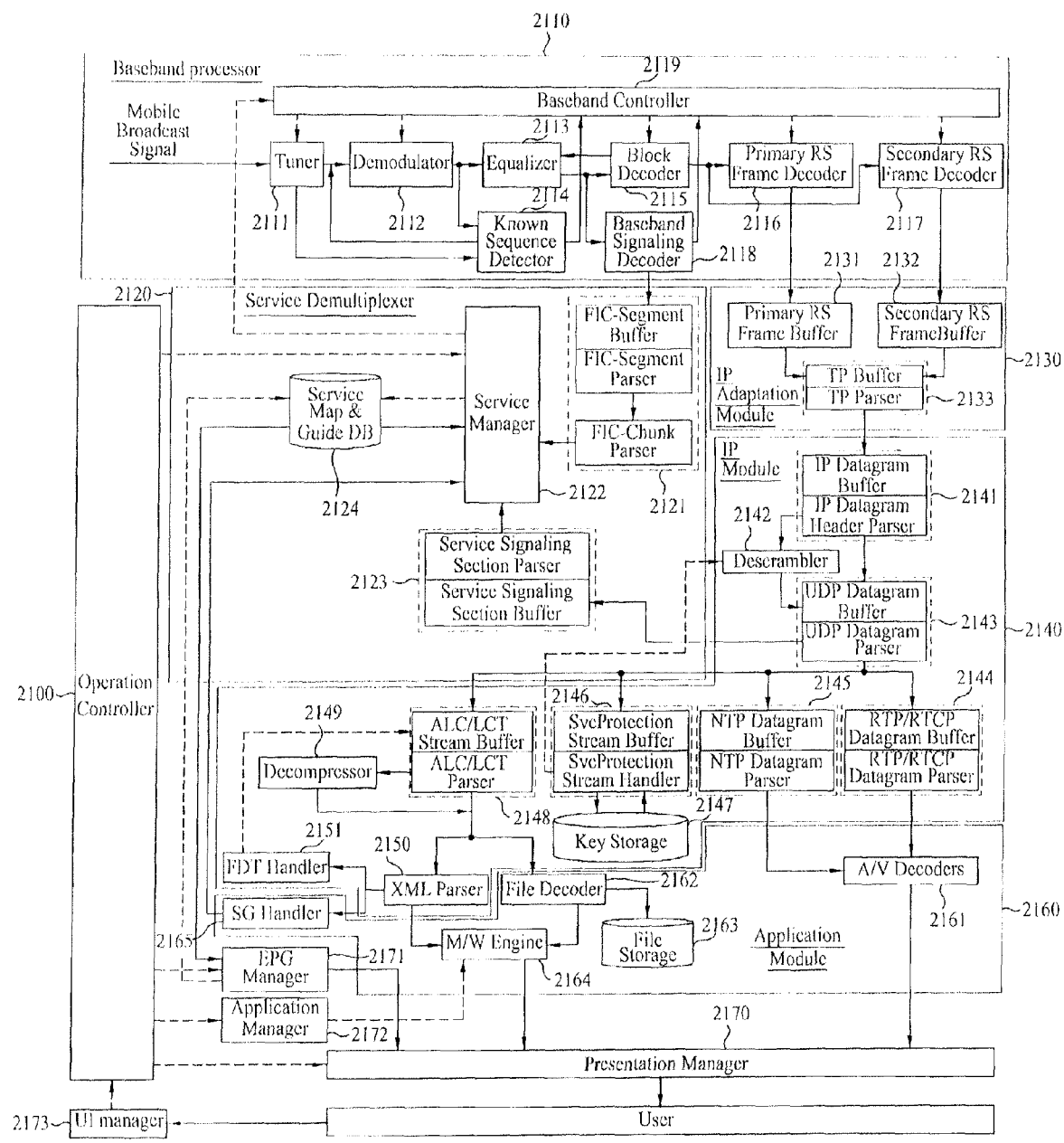
FIG. 27 illustrates a block diagram illustrating a broadcast receiver that provides a Mobile NRT service according to an embodiment of the present invention.

FIG. 27 illustrates a block diagram of a receiving system for receiving, storing and playing NRT content for NRT service. The solid arrow line in FIG. 27 indicates the Data path and the dotted arrow line indicates the Control signal path.

The receiving system according to the present invention may include an operation controller 2100, a tuner 2111, a demodulator 2112, an equalizer 2113, a known sequence detector (or known data detector) 2114, a block decoder 2115, a primary Reed-Solomon (RS) frame decoder 2116, a secondary RS frame decoder 2117, a signaling decoder 2118, and a baseband controller 2119. The receiving system according to the present invention may further include an FTC handler 2121, a service manager 2122, a service signaling handler 2123, and a first storage unit 2124. The receiving system according to the present invention may further include a primary RS frame buffer 2131, a secondary RS frame buffer 2132, and a transport packet (TS) handler 2133. The receiving system according to the present invention may further include an Internet Protocol (IP) datagram handler 2141, a descrambler 2142, an User Datagram Protocol (UDP) datagram handler 2143, a Real-time Transport Protocol/Real-time Transport Control Protocol (RTP/RTCP) datagram handler 2144, a Network Time Protocol (NTP) datagram handler 2145, a service protection stream handler 2146, a second storage unit 2147, an Asynchronous Layered Coding/Layered Coding Transport (ALC/LCT) stream handler 2148, an Extensible Mark-up Language (XML) parser 2150, and a Field Device Tool (FDT) handler 2151. The receiving system according to the present invention may further include an Audio/Video (A/V) decoder 2161, a file decoder 2162, a third storage unit 2163, a middle ware (M/W) engine 2164, and a Service Guide (SG) handler 2165. The receiving system according to the present invention may further include an Electronic Program Guide (EPG) manager 2171, an application manager 2172, and a User Interface (UI) manager 2173.

Herein, for simplicity of the description of the present invention, the tuner 2111, the demodulator 2112, the equalizer 2113, the known sequence detector (or known data detector) 2114, the block decoder 2115, the primary RS frame decoder 2116, the secondary RS frame decoder 2117, the signaling decoder 2118, and the baseband controller 2119 will be collectively referred to as a baseband processor 2110. The FIC handler 2121, the service manager 2122, the service signaling handler 2123, and the first storage unit 2124 will be collectively referred to as a service multiplexer 2120. The primary RS frame buffer 2131, the secondary RS frame buffer 2132, and the TS handler 2133 will be collectively referred to as an IP adaptation module 2130. The IP datagram handler 2141, the descrambler 2142, the UDP datagram handler 2143, the RTP/RTCP datagram handler 2144, the NTP datagram handler 2145, the service protection stream handler 2146, the second storage unit 2147, the ALC/LCT stream handler 2148, the XML parser 2150, and the FDT handler 2151 will be collectively referred to as a common IP module 2140. The A/V decoder 2161, the file decoder 2162, the third storage unit 2163, the M/W engine 2164, and the SG handler 2165 will be collectively referred to as an application module 2160.

In addition, although the terms used in FIG. 27 are selected from generally known and used terms, some of the terms mentioned in the description of FIG. 27 have been selected by the applicant at his or her discretion, the detailed meanings of which are described in relevant parts of the description herein. Furthermore, it is required that the present invention is understood, not simply by the actual terms used but by the meaning of each term lying within.

Referring to FIG. 27, the baseband controller 2119 controls the operation of each block included in the baseband processor 2110.

By tuning the receiving system to a specific physical channel frequency (or physical transmission channel frequency, PTC), the tuner 2111 enables the receiving system to receive main service data, which correspond to broadcast signals for fixed-type broadcast receiving systems, and mobile service data, which correspond to broadcast signals for mobile broadcast receiving systems. At this point, the tuned frequency of the specific physical channel is down-converted to an intermediate frequency (IF) signal, thereby being outputted to the demodulator 2112 and the known sequence detector 2114. More specifically, the tuner 2111 may receive main service data and mobile service data which are real-time service data, and receive non-real time service data.

The demodulator 2112 performs self-gain control, carrier recovery, and timing recovery processes on the passband digital IF signal inputted from the tuner 2111, thereby modifying the IF signal to a baseband signal. Then, the demodulator 2112 outputs the baseband signal to the equalizer 2113 and the known sequence detector 2114. The demodulator 2112 uses the known data symbol sequence inputted from the known sequence detector 2114 during the timing and/or carrier recovery, thereby enhancing the demodulating performance. The equalizer 2113 compensates channel-associated distortion included in the signal demodulated by the demodulator 2112. Then, the equalizer 2113 outputs the distortion-compensated signal to the block decoder 2115. By using a known data symbol sequence inputted from the known sequence detector 2114, the equalizer 2113 may enhance the equalizing performance. Furthermore, the equalizer 2113 may receive feed-back on the decoding result from the block decoder 2115, thereby enhancing the equalizing performance.

The known sequence detector 2114 detects known data place (or position) inserted by the transmitting system from the input/output data (i.e., data prior to being demodulated or data being processed with partial demodulation). Then, the known sequence detector 2114 outputs the detected known data position information and known data sequence generated from the detected position information to the demodulator 2112, the equalizer 2113, and the baseband controller 2119. Additionally, in order to allow the block decoder 2115 to identify the mobile service data that have been processed with additional encoding by the transmitting system and the main service data that have not been processed with any additional encoding, the known sequence detector 2114 outputs such corresponding information to the block decoder 2115.

If the data channel-equalized by the equalizer 2113 and inputted to the block decoder 2115 correspond to data processed with both block-encoding of serial concatenated convolution code (SCCC) method and trellis-encoding by the transmitting system (i.e., data within the RS frame, signaling data), the block decoder 2115 may perform trellis-decoding and block-decoding as inverse processes of the transmitting system. On the other hand, if the data channel—equalized by the equalizer 2113 and inputted to the block decoder 2115 correspond to data processed only with trellis-encoding and not block-encoding by the transmitting system (i.e., main service data), the block decoder 2115 may perform only trellis-decoding.

The signaling decoder 2118 decodes signaling data that have been channel-equalized and inputted from the equalizer 2113. It is assumed that the signaling data (or signaling information) inputted to the signaling decoder 2118 correspond to data processed with both block-encoding and trellis-encoding by the transmitting system. Examples of such signaling data may include transmission parameter channel (TPC) data and fast information channel (FIC) data.

For example, among the data that are being inputted, the signaling decoder 2118 performs regressive turbo decoding of a parallel concatenated convolution code (PCCC) method on data corresponding to the signaling information region. Subsequently, the signaling decoder 2118 separates FIC data and TPC data from the regressive-turbo-decoded signaling data. Additionally, the signaling decoder 2118 performs RS-decoding as inverse processes of the transmitting system on the separated TPC data, thereby outputting the processed data to the baseband controller 2119. Also, the signaling decoder 2118 performs deinterleaving in sub-frame units on the separated FIC data, so as to perform RS-decoding as inverse processes of the transmitting system on the deinterleaved FIC data, thereby outputting the processed data to the FIC handler 2121. The FIC data being deinterleaved and RS-decoded from the signaling decoder 2118 and outputted to the FIC handler 2121 are transmitted in units of FIC segments.

The FIC handler 2121 receives FIC data from the signaling decoder 2118, so as to extract signaling information for service acquisition (i.e., mapping information between an ensemble and a mobile service). In order to do so, the FIC handler 2121 may include an FIC segment buffer, an FIC segment parser, and an FIC chunk parser.

The FIC segment buffer buffers FIC segment groups being inputted in M/H frame units from the signaling decoder 2118, thereby outputting the buffered FIC segment groups to the FIC segment parser. Thereafter, the FIC segment parser extracts the header of each FIC segment stored in the FIC segment buffer so as to analyze the extracted headers. Then, based upon the analyzed result, the FIC segment parser outputs the payload of the respective FIC segments to the FIC chunk parser. The FIC chunk parser uses the analyzed result outputted from the FIC segment parser so as to recover the FIC chunk data structure from the FIC segment payloads, thereby analyzing the received FIC chunk data structure.

Subsequently, the FIC chunk parser extracts the signaling information for service acquisition. The signaling information acquired from the FIC chunk parser is outputted to the service manager 2122.

Meanwhile, the service signaling handler 2123 includes a service signaling buffer and a service signaling parser. The service signaling handler 2123 buffers table sections (for example, SMT sections) of a service signaling channel received from the UDP datagram handler 2143 and analyzes and processes the buffered table sections. The SMT information processed by the service signaling handler 2123 is also output to the service manager 2122.

In an embodiment, the SMT section or a service signaling channel that carries the SMT section is received within a corresponding RS frame in a format of a UDP/IP packet that has a well-known IP destination address and a well-known destination UDP port number. Accordingly, the reception system can parse each SMT section and descriptors of each SMT section without requiring additional information.

The SMT section provides signaling information (including IP access information) of all services in an ensemble that includes the SMT section. Therefore, the reception system can provide a service desired by the user to the user by accessing an IP stream component belonging to the desired service using the information parsed from the SMT.

If the service is an NRT service, access information of a FLUTE session that carries the content/files can extract from the SMT.

The information parsed from the SMT is collected by the service manager 2122 and is then stored in the first storage unit 2124. The service manager 2122 stores the information extracted from the SMT in the first storage unit 2124 in a service map and guide data format.

That is, the service manager 2122 uses the signaling information collected from each of the FIC handler 2121 and the service signaling handler 2123, so as to configure a service map. Thereafter, the service manager 2122 uses a service guide (SG) collected from the service guide (SG) handler 2165 so as to draw up a program guide. Then, the service manager 2122 controls the baseband controller 2119 so that a user can receive (or be provided with) a user-requested mobile service by referring to the service map and service guide. Furthermore, the service manager 2122 may also control the system so that the program guide can be displayed on at least a portion of the display screen based upon the user's input.

If the NRT service is described in the SMT through the control of the operation controller 2100, the service manager 2122 extracts NRT_service_info_descriptor, shown in FIG. 14, from the service loop and receives the service information of the NRT service which are application type and additional requirement information. Also, the service type of the NRT service is indicated in the NRT service guide output display through the presentation manager 2170. Further, using the other fields of the NRT_service_info_descriptor, detailed information of the NRT service is displayed. When the NRT service is displayed, if the controlled_rendering_flag field value is 1 then the NRT service is displayed in a sub-screen using the target_window_position_horizontal field, target_window_position_vertical field, target_window_length_horizontal field, and target_window_length_vertical field. If the application type of the NRT service is not supported by the current broadcast receiver, the information is displayed to the user through On Screen Display (OSD) so the user can know about it.

If the application type is Maintenance Data or Targeted Advertisement, download can be performed without user interruption therefore, the NRT service can be omitted when the guide is outputted.

The service manager 2122 controls the handling of the NRT service according to the service information acquired from NRT_service_info_descriptor( ). For example, assume that the application_type field value is 3, meaning that it is a targeted advertisement, and user_control_flag field value is '1.' In such a case it is not possible to arbitrarily delete the NRT service. Also, if the expiration period for playback is limited to 2 for the expiration_type and expiration_value field value, the NRT service is automatically deleted if it is played twice.

The first storage unit 2124 stores the service map and service guide drawn up by the service manager 2122. Also, based upon the requests from the service manager 2122 and the EPG manager 2171, the first storage unit 2124 extracts the required data, which are then transferred to the service manager 2122 and/or the EPG manager 2171.

The baseband controller 2119 receives the known data place information and TPC data, thereby transferring M/H frame time information, information indicating whether or not a data group exists in a selected parade, place information of known data within a corresponding data group, power control information, and so on to each block within the baseband processor 2110. The TPC data will be described in detail in a later.

Meanwhile, according to the present invention, the transmitting system uses RS frames by encoding units. Herein, the RS frame may be divided into a primary RS frame and a secondary RS frame. However, according to the embodiment of the present invention, the primary RS frame and the secondary RS frame will be divided based upon the level of importance of the corresponding data.

The primary RS frame decoder 2116 receives, as an input, the output of the block decoder 2115. Here, in an embodiment, the primary RS frame decoder 2116 receives mobile service data or NRT service data, which has been encoded through Reed Solomon (RS) encoding and/or Cyclic Redundancy Check (CRC) encoding, from the block decoder 2115. The primary RS frame decoder 2116 may also receive SMT section data or OMA BCAST SG data, which has been encoded through Reed Solomon (RS) encoding and/or Cyclic Redundancy Check (CRC) encoding, from the block decoder 2115.

That is, the primary RS frame decoder 2116 receives data that is not main service data, for example, at least one of mobile service data, NRT service data, SMT section data, and OMA BCAST SG data.

The primary RS frame decoder 2116 performs inverse processes of an RS frame encoder (not shown) included in the digital broadcast transmitting system, thereby correcting errors existing within the primary RS frame. More specifically, the primary RS frame decoder 2116 forms a primary RS frame by grouping a plurality of data groups and, then, correct errors in primary RS frame units. In other words, the primary RS frame decoder 2116 decodes primary RS frames, which are being transmitted for actual broadcast services. The primary RS frame decoded by the primary RS frame decoder 2116 outputs to the primary RS frame buffer 2131. The primary RS frame buffer 2131 buffers the primary RS frame, and then configures an M/H TP in each row unit. The M/H TPs of the primary RS frame outputs to the TP handler 2133.

Additionally, the secondary RS frame decoder 2117 receives, as an input, the output of the block decoder 2115. Herein, in an embodiment, the secondary RS frame decoder 2117 receives mobile service data or NRT service data, which has been encoded through Reed Solomon (RS) encoding and/or Cyclic Redundancy Check (CRC) encoding, from the block decoder 2115. The secondary RS frame decoder 2117 may also receive SMT section data or OMA BCAST SG data, which has been encoded through Reed Solomon (RS) encoding and/or Cyclic Redundancy Check (CRC) encoding, from the block decoder 2115.

That is, the secondary RS frame decoder 2117 receives data that is not main service data, for example, at least one of mobile service data, NRT service data, SMT section data, and OMA BCAST SG data.

The secondary RS frame decoder 2117 performs inverse processes of an RS frame encoder (not shown) included in the digital broadcast transmitting system, thereby correcting errors existing within the secondary RS frame. More specifically, the secondary RS frame decoder 2117 forms a secondary RS frame by grouping a plurality of data groups and, then, correct errors in secondary RS frame units. In other words, the secondary RS frame decoder 2117 decodes secondary RS frames, which are being transmitted for actual broadcast services. The secondary RS frame decoded by the secondary RS frame decoder 2117 outputs to the secondary RS frame buffer 2132. The secondary RS frame buffer 2132 buffers the secondary RS frame, and then configures an M/H TP in each row unit. The M/H TPs of the secondary RS frame outputs to the TP handler 2133.

The TP handler 2133 consists of a TP buffer and a TP parser. The TP handler 2133 buffers the M/H TPs inputted from the primary RS frame buffer 2131 and the secondary RS frame buffer 2132, and then extracts and analyzes each header of the buffered M/H TPs, thereby recovering IP datagram from each payload of the corresponding M/H TPs. The recovered IP datagram is outputted to the IP datagram handler 2141.

The IP datagram handler 2141 consists of an IP datagram buffer and an IP datagram parser. The IP datagram handler 2141 buffers the IP datagram delivered from the TP handler 2133, and then extracts and analyzes a header of the buffered IP datagram, thereby recovering UDP datagram from a payload of the corresponding IP datagram. The recovered UDP datagram is outputted to the UDP datagram handler 2143.

If the UDP datagram is scrambled, the scrambled UDP datagram is descrambled by the descrambler 2142, and the descrambled UDP datagram is outputted to the UDP datagram handler 2143. For example, when the UDP datagram among the received IP datagram is scrambled, the descrambler 2142 descrambles the UDP datagram by inputting an encryption key and so on from the service protection stream handler 2146, and outputs the descrambled UDP datagram to the UDP datagram handler 2143.

The UDP datagram handler 2143 consists of an UDP datagram buffer and an UDP datagram parser. The UDP datagram handler 2143 buffers the UDP datagram delivered from the IP datagram handler 2141 or the descrambler 2142, and then extracts and analyzes a header of the buffered UDP datagram, thereby recovering data transmitted through a payload of the corresponding UDP datagram. If the recovered data is an RTP/RTCP datagram, the recovered data is outputted to the RTP/RTCP datagram handler 2144. If the recovered data is also an NTP datagram, the recovered data is outputted to the NTP datagram handler 2145. Furthermore, if the recovered data is a service protection stream, the recovered data is outputted to the service protection stream handler 2146. And, if the recovered data is an ALC/LCT stream, the recovered data is outputted to the ALC/LCT steam handler 2148. Also, when the recovered data is SMT section data, the recovered data output to the service signaling section handler 2123.

Since the SMT section or the service signaling channel that carries the SMT section is an IP datagram having a well-known IP destination address and a well-known destination UDP port number, the IP datagram handler 2141 and the UDP datagram handler 2143 can output data including the SMT section to the service signaling section handler 2123 without requiring additional information.

The RTP/RTCP datagram handler 2144 consists of an RTP/RTCP datagram buffer and an RTP/RTCP datagram parser. The RTP/RTCP datagram handler 2144 buffers the data of RTP/RTCP structure outputted from the UDP datagram handler 2143, and then extracts A/V stream from the buffered data, thereby outputting the extracted A/V stream to the A/V decoder 2161.

The A/V decoder 2161 decodes the audio and video streams outputted from the RTP/RTCP datagram handler 2144 using audio and video decoding algorithms, respectively. The decoded audio and video data is outputted to the presentation manager 2170. Herein, at least one of an AC-3 decoding algorithm, an MPEG 2 audio decoding algorithm, an MPEG 4 audio decoding algorithm, an AAC decoding algorithm, an AAC+ decoding algorithm, an HE AAC decoding algorithm, an AAC SBR decoding algorithm, an MPEG surround decoding algorithm, and a BSAC decoding algorithm can be used as the audio decoding algorithm and at least one of an MPEG 2 video decoding algorithm, an MPEG 4 video decoding algorithm, an H.264 decoding algorithm, an SVC decoding algorithm, and a VC-1 decoding algorithm can be used as the audio decoding algorithm.

The NTP datagram handler 2145 consists of an NTP datagram buffer and an NTP datagram parser. The NTP datagram handler 2145 buffers data having an NTP structure, the data being outputted from the UDP datagram handler 2143. Then, the NTP datagram handler 2145 extracts an NTP stream from the buffered data. Thereafter, the extracted NTP stream is outputted to the A/V decoder 2161 so as to be decoded.

The service protection stream handler 2146 may further include a service protection stream buffer. Herein, the service protection stream handler 2146 buffers data designated (or required) for service protection, the data being outputted from the UDP datagram handler 2143. Subsequently, the service protection stream handler 2146 extracts information required for descrambling from the extracted data. The information required for descrambling includes a key value, such as SKTM and LKTM. The information for descrambling is stored in the second storage unit 2147, and, when required, the information for descrambling is outputted to the descrambler 2142.

The ALC/LCT stream handler 2148 consists of an ALC/LCT stream buffer and an ALC/LCT stream parser. And, the ALC/LCT stream handler 2148 buffers data having an ALC/LCT structure, the data being outputted from the UDP datagram handler 2143. Then, the ALC/LCT stream handler 2148 analyzes a header and a header expansion of an ALC/LCT session from the buffered data. Based upon the analysis result of the header and header expansion of the ALC/LCT session, when the data being transmitted to the ALC/LCT session correspond to an XML structure, the corresponding data are outputted to an XML parser 2150. Alternatively, when the data being transmitted to the ALC/LCT session correspond to a file structure, the corresponding data are outputted to a file decoder 2162. At this point, when the data that are being transmitted to the ALC/LCT session are compressed, the compressed data are decompressed by a decompressor 2149, thereby being outputted to the XML parser 2150 or the file decoder 2162.

The XML parser 2150 analyses the XML data being transmitted through the ALC/LCT session. Then, when the analyzed data correspond to data designated to a file-based service such as NRT service, the XML parser 2150 outputs the corresponding data to the FDT handler 2151. On the other hand, if the analyzed data correspond to data designated to a service guide, the XML parser 2150 outputs the corresponding data to the SG handler 2165. The FDT handler 2151 analyzes and processes a file description table of a FLUTE protocol, which is transmitted in an XML structure through the ALC/LCT session.

The SG handler 2165 collects and analyzes the data designated for a service guide, the data being transmitted in an XML structure, thereby outputting the analyzed data to the service manager 2122.

The file decoder 2162 decodes the data having a file structure and being transmitted through the ALC/LCT session, thereby outputting the decoded data to the middleware engine 2164 or storing the decoded data in a third storage unit 2163. In an embodiment the decoded file structured data in the File Decoder 2162 includes NRT service data.

Herein, the middleware engine 2164 translates the file structure data (i.e., the application) such as NRT service and executes the translated application. Thereafter, the application may be outputted to an output device, such as a display screen or speakers, through the application presentation manager 2170. According to an embodiment of the present invention, the middleware engine 2164 corresponds to a JAVA-based middleware engine.

Based upon a user-input, the EPG manager 2171 receives EPG data either through the service manager 2122 or through the SG handler 2165, so as to convert the received EPG data to a display format, thereby outputting the converted data to the presentation manager 2170.

The application manager 2172 performs overall management associated with the processing of application data (i.e., NRT service data), which are being transmitted in object formats, file formats, and so on. Furthermore, based upon a user-command inputted through the UI manager 2173, the operation controller 2100 controls at least one of the service manager 2122, the EPG manager 2171, the application manager 2172, and the presentation manager 2170, so as to enable the user-requested function to be executed.

The UI manager 2173 transfers the user-input to the operation controller 2100 through the UI.

Finally, the presentation manager 2170 provides at least one of the audio and video data being outputted from the A/V decoder 2161 and the EPG data being outputted from the EPG manager 2171 to the user through the speaker and/or display screen.

According to the present invention, the method of processing an NRT service and broadcast receiver includes signaling service information including service type and detail information of service type of an NRT service in the signaling information table so the broadcast receiver is able to handle various use case. The broadcast receiver can efficiently process the NRT service by using the signaled service information in the signaling information table for various codec combinations according to the NRT use case such as targeted advertisement, music download, and push VOD, and also for hardware module within the connected broadcast receiver and various storage and playback scenarios.

The present invention is not limited to the above embodiments and it will be apparent to those skilled in the art that various modifications can be made to in the present invention as can be seen from the appended claims and such modifications are included in the scope of the invention.

What is claimed is:

1. A method of transmitting a non-real time service, the method comprising:
generating first signaling data containing service-level attributes for a non-real time service and second signaling data including a service fragment and a content fragment of a service guide for the non-real time service;
generating IP datagrams containing one or more non-real time services, the first signaling data and the second signaling data; and
generating and transmitting a broadcast signal including the IP datagrams,
wherein:
the non-real time service is delivered in advance of its use and stored in a receiving device and associated with one or more content items,
the content item is composed of one or more files being delivered via a File Delivery over Unidirectional Transport (FLUTE) file delivery session,
the service fragment includes an element indicating that the service fragment contains information regarding the identified non-real time service, and
the content fragment includes a linkage element linking from a content item to one or more files, the linkage element having an identifier of the content item, the identifier of the content item being used to map one or more files to the content item with a content identifier included in a FLUTE File Description Table (FDT) instance for the non-real time service.

2. The method of claim 1, further comprising:
generating third signaling data containing Fast Information Channel (FIC) data providing fast service acquisition at the receiving device; and
generating fourth signaling data containing Transmission Parameter Channel (TPC) data which includes parameters used in a physical layer module.

3. The method of claim 2, wherein the NRT service is signaled based on a hierarchy among the first signaling data, the third signaling data and fourth signaling data.

4. The method of claim 3, wherein the linkage element of the content fragment includes information indicating an attribute that identifies the file as an entry point of the content item identified by the parameter, the entry point is presented initially the file of the content item by the receiving device.

5. An apparatus of transmitting a non-real time service, the apparatus comprising:
a processor configured to generate first signaling data containing service-level attributes for a non-real time service, second signaling data including a service fragment and a content fragment of a service guide for the non-real time service, and IP datagrams containing one or more non-real time services, the first signaling data and the second signaling data; and
a transmitter configured to transmit a broadcast signal including IP datagrams,
wherein:
the non-real time service is delivered in advance of its use and stored in a receiving device and associated with one or more content items,
the content item is composed of one or more files being delivered via a File Delivery over Unidirectional Transport (FLUTE) file delivery session,
the service fragment includes an element indicating that the service fragment contains information regarding the identified non-real time service, and
the content fragment includes a linkage element linking from a content item to one or more files, the linkage element having an identifier of the content item, the identifier of the content item being used to map one or more files to the content item with a content identifier included in a FLUTE File Description Table (FDT) instance for the non-real time service.

6. The apparatus of claim 5, wherein the processor further generates:
third signaling data containing Fast Information Channel (FIC) data providing fast service acquisition at the receiving device; and
fourth signaling data containing Transmission Parameter Channel (TPC) data which includes parameters used in a physical layer module.

7. The apparatus of claim 6, wherein the NRT service is signaled based on a hierarchy among the first signaling data, the third signaling data and fourth signaling data.

8. The apparatus of claim 7, wherein the linkage element of the content fragment includes information indicating an attribute that identifies the file as an entry point of the content item identified by the parameter, the entry point is presented initially the file of the content item by the receiving device.

* * * * *